(12) United States Patent
Gasbarro

(10) Patent No.: US 12,302,914 B2
(45) Date of Patent: May 20, 2025

(54) REMOVING FEATHERS FROM POULTRY CARCASSES

(71) Applicant: JBT Marel Corporation, Chicago, IL (US)

(72) Inventor: Joseph L. Gasbarro, Bexley, OH (US)

(73) Assignee: JBT Marel Corporation, Chicago, IL (US)

( * ) Notice: Subject to any disclaimer, the term of this patent is extended or adjusted under 35 U.S.C. 154(b) by 193 days.

(21) Appl. No.: 17/997,950

(22) PCT Filed: May 7, 2021

(86) PCT No.: PCT/US2021/031383
§ 371 (c)(1),
(2) Date: Nov. 4, 2022

(87) PCT Pub. No.: WO2021/226518
PCT Pub. Date: Nov. 11, 2021

(65) Prior Publication Data
US 2023/0172220 A1 Jun. 8, 2023

Related U.S. Application Data

(60) Provisional application No. 63/021,553, filed on May 7, 2020.

(51) Int. Cl.
A22C 21/00 (2006.01)
A22C 21/02 (2006.01)
A22C 21/04 (2006.01)

(52) U.S. Cl.
CPC ............ *A22C 21/04* (2013.01); *A22C 21/022* (2013.01)

(58) Field of Classification Search
CPC ........ A22C 21/04; A22C 21/02; A22C 21/022
USPC .......................................................... 452/74
See application file for complete search history.

(56) References Cited

U.S. PATENT DOCUMENTS

| | | | | |
|---|---|---|---|---|
| 2,649,615 A | * | 8/1953 | Sharp | A22C 21/04 62/375 |
| 3,253,246 A | * | 5/1966 | McConnell | H05K 1/14 439/43 |
| 3,689,958 A | * | 9/1972 | Dillon | A22C 21/04 134/171 |
| 3,716,892 A | | 2/1973 | Miles et al. | |
| 3,797,068 A | | 3/1974 | Dillon | |

(Continued)

OTHER PUBLICATIONS

International Search Report and Written Opinion mailed Aug. 6, 2021, issued in International Patent Application No. PCT/US2021/031383, filed May 7, 2021, 8 pages.

*Primary Examiner* — Richard T Price, Jr.
(74) *Attorney, Agent, or Firm* — Christensen O'Connor Johnson Kindness PLLC

(57) ABSTRACT

A system (20) for removing feathers from poultry carcasses (50), including a scalding apparatus (28) that applies the dual cascade of heated water downwardly onto poultry carcasses passing beneath. A quill picking unit (30) follows the dual cascade scalding apparatus (26) to remove the feathers from the carcass after the pores have been enlarged by the dual cascade of scalding water. After the feathers have been pulled from the carcass (50), the carcass is passed through a chiller (40) which applies a dual cascade of cooling water downwardly onto the carcasses passing through the chilling unit.

20 Claims, 21 Drawing Sheets

(56) References Cited

U.S. PATENT DOCUMENTS

| | | | | |
|---|---|---|---|---|
| 4,852,215 | A | * | 8/1989 | Covell, III ........... A23B 4/0053 452/80 |
| 4,944,068 | A | * | 7/1990 | Covell, III ............. A22C 21/04 452/77 |
| 5,605,503 | A | * | 2/1997 | Martin ............... A22C 21/0061 452/89 |
| 5,938,519 | A | * | 8/1999 | Wright ................... A22C 21/04 452/77 |
| 6,547,659 | B1 | | 4/2003 | Adachi et al. |
| 9,683,773 | B1 | * | 6/2017 | Gasbarro ............... A22C 21/02 |
| 2020/0131068 | A1 | | 4/2020 | McNaughton et al. |
| 2024/0122190 | A1 | * | 4/2024 | Cambre ............. A22C 21/0046 |

* cited by examiner

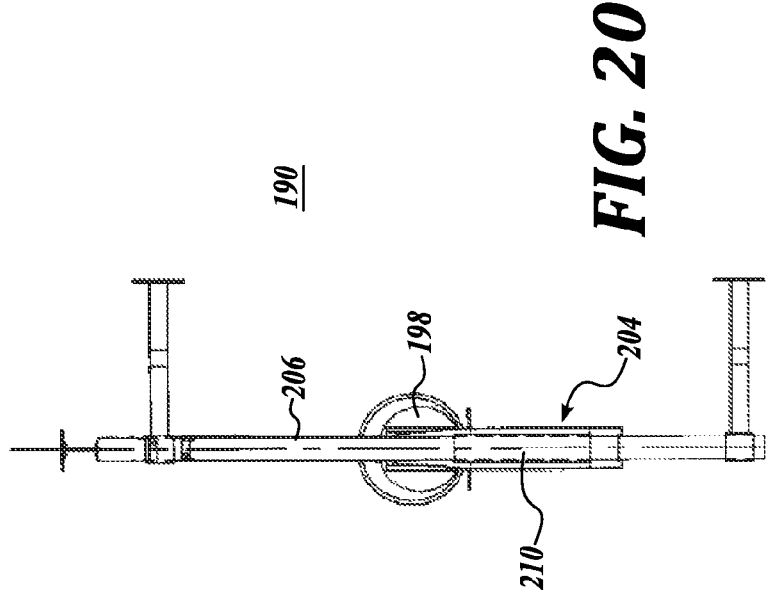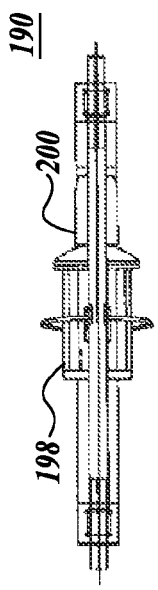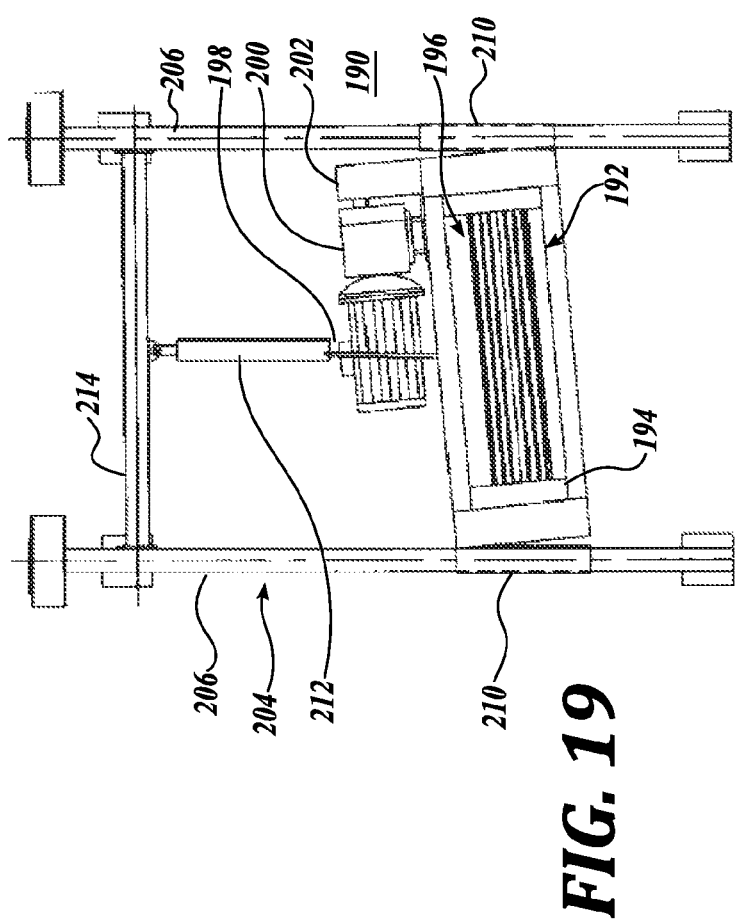

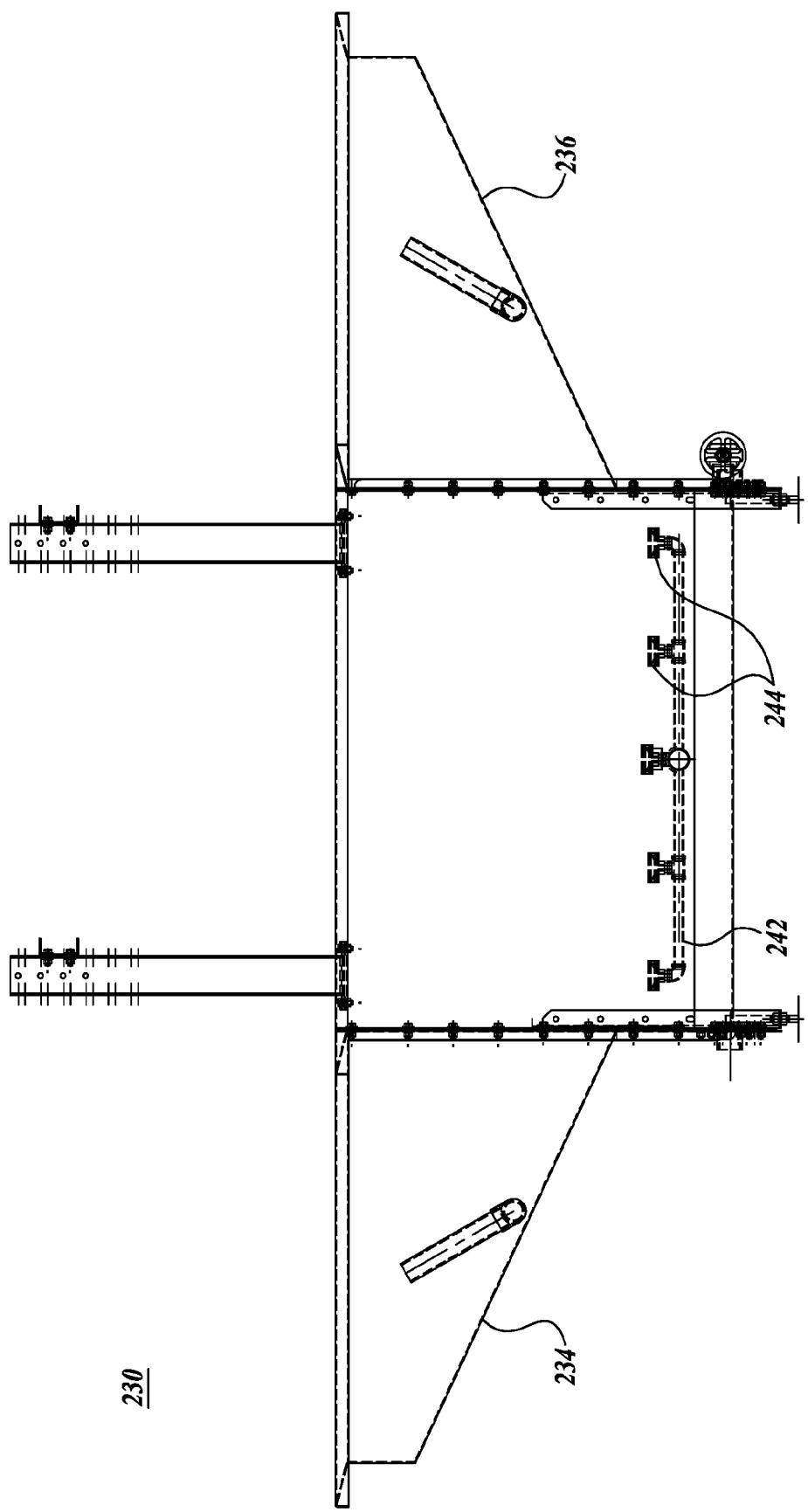

REMOVING FEATHERS FROM POULTRY CARCASSES

CROSS-REFERENCE TO RELATED APPLICATION

This patent application claims priority of U.S. Patent Application No. 63/021,553, filed on May 7, 2020, the entire disclosure of which is hereby incorporated by reference herein for all purposes.

BACKGROUND

Currently, in large scale poultry processing, the most common method for removing feathers from the poultry carcasses after slaughtering is to transport the carcasses upside-down by the feet, which are attached to an overhead conveyor rail, through the defeathering process. To remove the poultry feathers, the carcasses are passed through a submersion scalder in the form of tank, or a series of tanks, of heated and agitated water. While traveling through the submersion scalder, the feathers of the carcasses are ruffled and dirt and debris are removed from the carcasses. Also, the pores of the carcasses are relaxed and opened to facilitate removal of the feathers. From the submersion scalder, the carcasses travel through a series of machines or pickers that remove the feathers from the carcasses.

One drawback of the foregoing system and method for removing feathers from poultry carcasses is that the water remains in the submersion tank(s) throughout a working shift, which is generally eight hours, without there being an acceptable way to remove the dirt and debris therein, which includes fecal matter. As such, the submersion tanks foster the proliferation of microbials and pathogens, including *salmonella* and *campylobacter*. Further, there can be cross contamination of microbials/pathogens between the carcasses that are being processed. Currently, a major priority in poultry processing is to reduce the presence of microbial and pathogen counts. This is difficult to achieve when scalding of the carcass occurs in standard submersion scalding tanks.

Also, the current methodology for scalding poultry carcasses prior to feather removal does not lend itself to increasing the capacity of poultry processing lines without adding longer length submersion scalding tanks and more feather pickers. As a result, additional valuable floor space is needed, which is counter-productive to the overall goal to increase carcass processing capacity in an effort to reduce the cost of processing poultry carcasses.

The present disclosure seeks to address the limitations of current methods and systems for defeathering poultry carcasses.

SUMMARY

In accordance with one embodiment of the present disclosure, a method for removing feathers from poultry carcasses comprises: (a) scalding the poultry carcasses by passing the carcasses under a dual cascade of heated water; (b) after the scalding of the carcasses, passing the carcasses through a quill picking unit to pull the feathers from the heated carcasses; (c) after passing the carcass through the quill picking machine, cooling the carcasses by passing the carcasses under a cascade of chilled water.

In any of the embodiments disclosed herein, wherein after passing the carcass through the quill picking machine, re-scalding the carcasses at least one additional time by again passing the carcasses under a dual cascade of heated water, and then passing the carcasses through a quill picking machine to pull further feathers from the carcasses.

In any of the embodiments disclosed herein, further comprising collecting the heated water after cascading over the carcasses, filtering the collected heated water for removal of particulate matter, and recirculating the filtered water to again cascade over the poultry carcasses.

In any of the embodiments disclosed herein, further comprising adding makeup heated water for cascading over the poultry carcasses.

In any of the embodiments disclosed herein, wherein before the initial dual cascade of heated water is applied to the carcasses, ruffling in the feathers of the carcasses to cause the feathers to stand out from the carcasses.

In any of the embodiments disclosed herein, further comprising applying heated water to the carcasses while or before ruffling the feathers of the carcass.

In any of the embodiments disclosed herein, wherein before ruffling the feathers of the carcasses, removing the tail quills from the carcasses.

In any of the embodiments disclosed herein, further comprising removing the tail quills from the carcasses before the initial scalding of the carcasses with the dual cascade of heated water.

In any of the embodiments disclosed herein, wherein after ruffling the feathers of the carcasses, passing the carcasses through a quill picking machine to pull feathers from the carcasses. while at the same time applying heated water to the carcasses.

In any of the embodiments disclosed herein, further comprising applying heated water to the carcasses while passing the carcasses through the quill picking machine.

In any of the embodiments disclosed herein, further comprising before scalding the carcasses with a dual cascade of heated water, passing the carcasses through a quill picking machine to pull the feathers from the carcasses.

In any of the embodiments disclosed herein, further comprising applying heated water to the carcasses while passing the carcasses through the quill picking machine.

In accordance with another embodiment of the present disclosure, a system for removing feathers from poultry carcasses includes a scalding apparatus for scalding the poultry carcass to open the pores of the carcasses, the scalding apparatus comprising: (a) a reservoir for retaining heated water; (b) a first plenum located above the reservoir for receiving the heated water from the reservoir; (c) a second plenum positioned above the reservoir for receiving the heated water from the reservoir; (d) the first and second plenums spaced apart from each other to define a gap therebetween through which the poultry carcasses can travel; (e) a circulation pump in communication with the reservoir and at least one of the plenums for pumping the heated water from the reservoir to at least one of the plenums causing the heated water to overflow out of the two plenums and cascade downwardly into the gap and onto the poultry carcasses passing through the gap.

In any of the embodiments disclosed herein, further comprising a quill picking machine located downstream of the scalding apparatus for pulling the feathers from the carcasses.

In any of the embodiments disclosed herein, wherein the quill picking machine comprising rotating fingers that slide along the surfaces of the carcasses to remove the feathers from the carcasses.

In any of the embodiments disclosed herein, further comprising a cooling unit for applying a cascade of cooling water over the carcasses after removal of the feathers from the carcasses.

In any of the embodiments disclosed herein, further comprising a second scalding apparatus positioned downstream of the quill picking machine.

In any of the embodiments disclosed herein, further comprising a further quill picking machine positioned downstream of the second scalding apparatus to remove further feathers from the carcasses.

In any of the embodiments disclosed herein, further comprising a cooling unit for applying a cascade of cooling water over the carcasses after removal of the feathers from the carcasses.

In any of the embodiments disclosed herein, further comprising a recirculation system for collecting the heated water after cascading over the carcasses, filtering the heated water to remove particulate matter, and recirculating the filtered heated water to the scalding apparatus.

In any of the embodiments disclosed herein, further comprising at least one additional scalding apparatus.

In any of the embodiments disclosed herein, wherein the scalding apparatus is positioned so that a quill picking unit for removing the feathers of the carcasses is positioned after each scalding apparatus.

In any of the embodiments disclosed herein, further comprising a cooling unit located after the last quill picking unit for applying a cascade of cooling water over the carcasses after removal of the feathers from the carcasses.

In any of the embodiments disclosed herein, further comprising a brushing unit positioned upstream from the scalding apparatus, the brushing unit operable to ruffle the feathers of the poultry carcasses and for removing debris from the carcasses.

In any of the embodiments disclosed herein, further comprising a tail quill picking unit for removing the feathers from the carcasses, the quill picking machine positioned downstream from the brushing unit and upstream from the scalding unit.

In any of the embodiments disclosed herein, wherein the tail quill picking unit comprising a source of hot water to apply to the carcasses during the operation of the quill picking unit.

In any of the embodiments disclosed herein, further comprising a tail quill picking unit located upstream of the brushing unit for removing the tail feathers from the carcass.

In any of the embodiments disclosed herein, further comprising a source of circulated heated water for applying to the carcasses prior to arriving at the tail quill picking unit.

In any of the embodiments disclosed herein, further comprising a source of circulated heated water for applying to the carcass prior to the brushing unit.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 19 is a side elevational view of a tail quill picking unit;

FIG. 20 is an end view of FIG. 19;

FIG. 21 is a top view of FIG. 19;

FIG. 22 is a side elevational view of a hot water circulation tank; and

DETAILED DESCRIPTION

The description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "horizontal," "vertical," "top," "bottom," "right hand," "left hand," "in," "out," "extended," "advanced," "retracted," "proximal," and "distal." These references and other similar references in the present application are only to assist in helping describe and understand the present disclosure and are not intended to limit the present invention to these directions.

The present application may include modifiers such as the words "generally," "approximately," "about," or "substantially." These terms are meant to serve as modifiers to indicate that the "dimension," "shape," "temperature," "time," or other physical parameter in question need not be exact but may vary as long as the function that is required to be performed can be carried out. For example, in the phrase "generally circular in shape," the shape need not be exactly circular as long as the required function of the structure in question can be carried out.

In the following description and in the accompanying drawings, corresponding systems, assemblies, apparatus, and units may be identified by the same part number, but with an alpha suffix. The descriptions of the parts/components of such systems assemblies, apparatus, and units that are the same or similar are not repeated so as to avoid redundancy in the present application.

Figure 1:
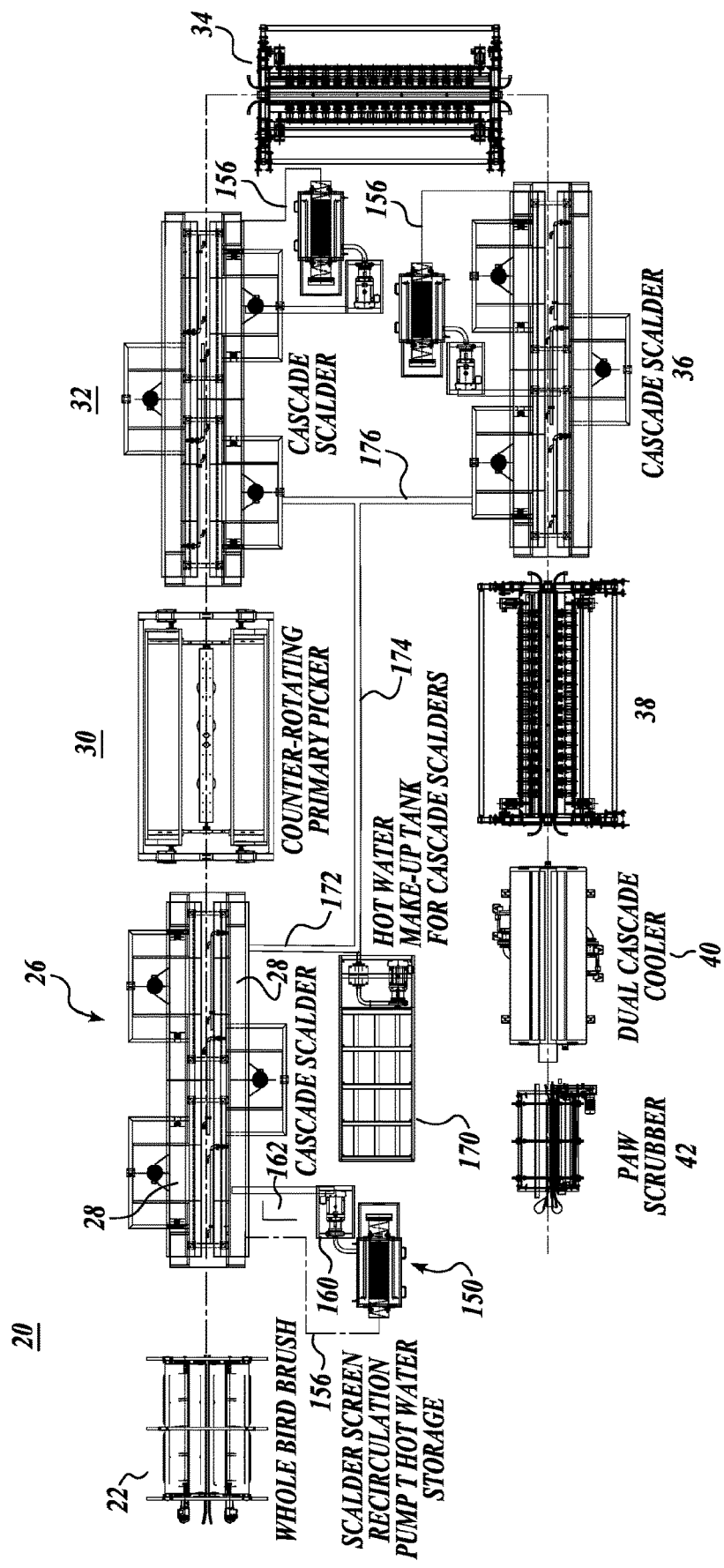
FIG. 1 is a schematic flow diagram of a system for removing feathers from poultry carcasses.
Figure 3:
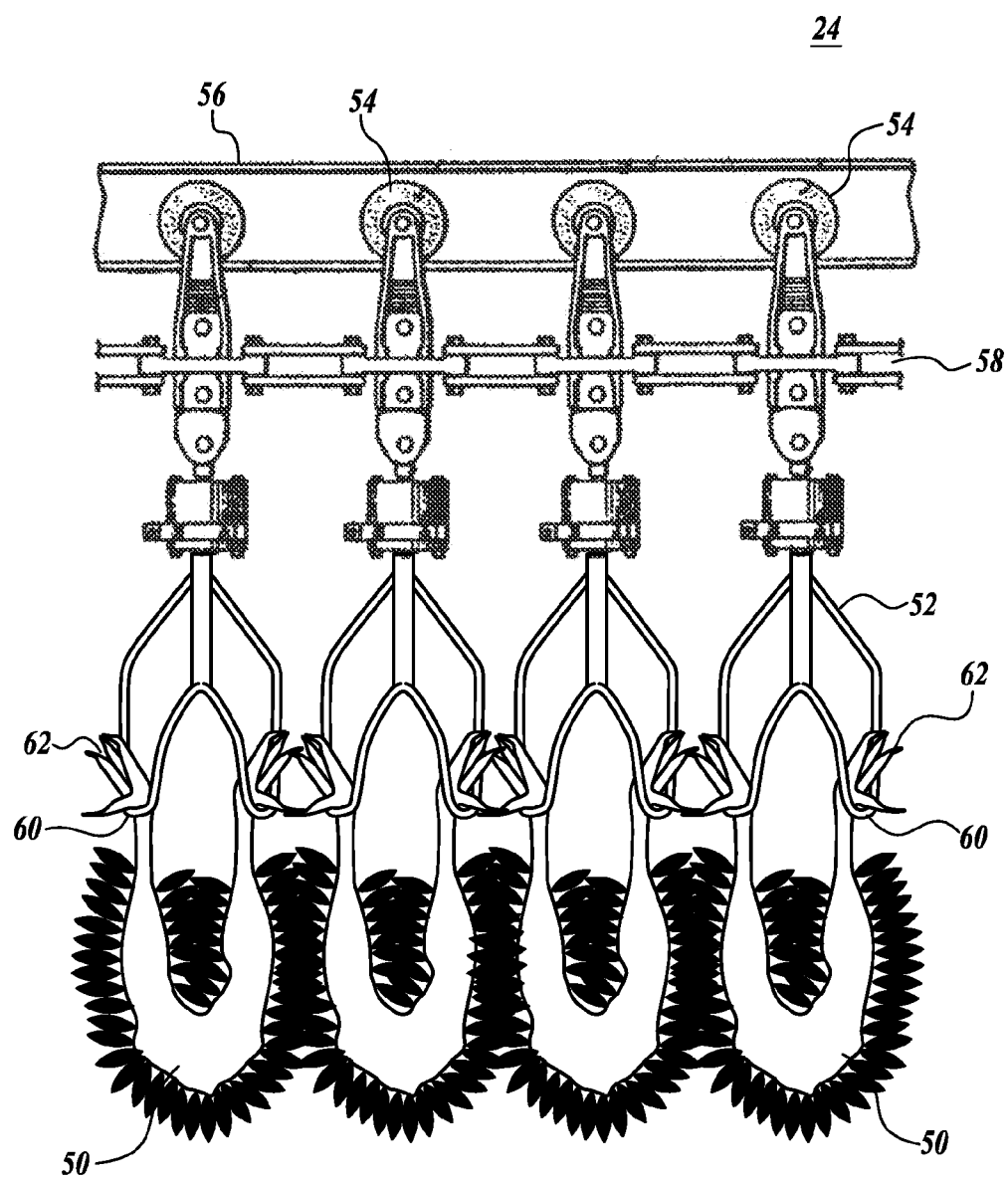
FIGS. 3 and 4 illustrate the manner in which poultry carcasses are transported through the process of removing feathers from the carcasses while being suspended from an overhead conveyor system.
Figure 4:
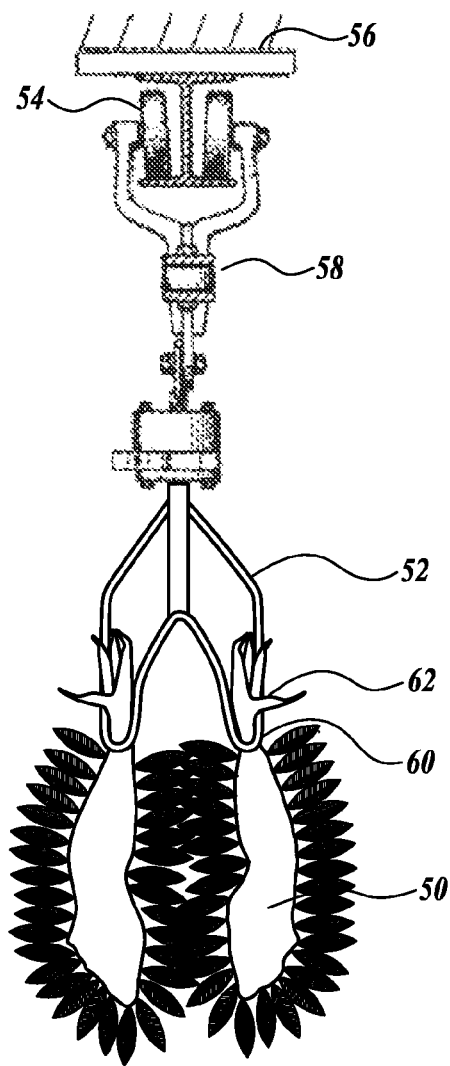

Referring initially to FIG. 1, illustrated is a schematic view of an exemplary system 20 for removing the feathers from poultry carcasses. The system includes a brushing unit 22 to brush the poultry carcasses as they pass through the unit in upside-down position suspended from an overhead conveyor system 24, as illustrated in FIGS. 3 and 4 and described below. The brushing unit 22 ruffles the feathers of the poultry carcasses and also causes dirt and other debris to fall out of the carcass feathers. A dual cascade scalding apparatus 26 is positioned downstream of the brushing units 22. In the scalding unit 26, streams of hot water cascade from plenum chambers 28 positioned on each side of a longitudinal gap in the center of the unit through which the poultry carcasses travel. While passing through the dual cascade scalder unit, the carcasses are sufficiently heated so that the pores are opened which enables the feathers to be removed therefrom. Also, dirt and other debris not removed by the brushing unit 22, is removed at this point. As discussed in more detail below, the dual cascade scalding units 26 scald the poultry carcasses faster and while using less water than in past systems, and also seek to minimize the bacterial count on the carcasses.

Next, in the system 20, the poultry carcasses pass through a primary quill picking unit 30 for pulling the feathers from the poultry carcasses. In one exemplary form, the quill picking unit includes a series of rotating, flexible fingers that slide against the exterior of the carcass to press against the feathers of the carcass and thereby pull the feathers from the carcass.

As also shown in FIG. 1, a second dual cascading scalding unit 32 is located downstream from the quill picking unit 30. The second scalding unit 32 can be constructed in the same manner as scalding unit 26. A second picking unit 34 is located downstream of the second scalding unit 32. The second picking unit 34 functions to remove additional feathers from the carcass. In this regard, rotating flexible fingers are also employed to pull the feathers from the carcass, but the arrangement of the flexible fingers differs from that of the quill picking unit 30, as described more fully below.

A third dual cascading scalding unit 36 is located downstream of the quill picking unit 34. The third dual cascading scalding unit 36 can be constructed in the same manner as the first and second dual cascading scalding units 26 and 32 noted above. A third quill picking unit 38 is located downstream from the third scalding unit 36. Quill picking unit 38 may be similar or of the same construction as the quill picking unit 34 noted above.

Although three scalding units 26, 32 and 36 are shown in FIG. 1, the number of scalding units may differ from system to system depending on various factors, including the size of the poultry carcasses, the type of poultry carcasses, the speed of travel of the poultry carcasses along the overhead conveyor 24, the lengths of the scalding units, as well as the lengths of the quill picking units 30, 34 and 38. As such, the system may utilize a fewer number of scalding units or a larger number of scalding units. In each case, a quill picking unit follows a scalding unit.

After the last quill picking unit, a dual cascade cooling unit 40 is employed to rapidly cool the poultry carcass so as to reduce bacterial or other pathogen activity, as well as to reduce the loss of fat and other temperature-dependent materials from the carcass.

Lastly, the system includes a paw scrubber 42 which functions to clean the claws or paws of the poultry carcass prior to severing the paws from the carcasses and then rehanging the carcasses on the evisceration line.

Next, describing the foregoing components of system 20 in more detail, initially referring to FIGS. 3 and 4, poultry carcasses 50 are illustrated as suspended from an overhead chain type conveyor system 24. The conveyor 24 consists of a series of holder units 52 that depend downwardly from side-by-side wheels 54 that ride on the lower flange on opposite sides of the web of the I-beam that forms an overhead rail 56. The holders 52 are attached to a chain 58 that is powered to cause the holders 52 to travel along the rail 56. In a standard manner, each of the holders 52 includes two pairs of U-shaped hangers 60 for receiving the joints 62 or paws (not shown) at the ends of the legs of the carcasses so that the joints are held captive in the U-shaped hangers. As shown in FIG. 4, the carcasses 50 are typically hung side by side by the holders 52, so that two streams of carcasses travel through the system 20 simultaneously.

Figure 5:
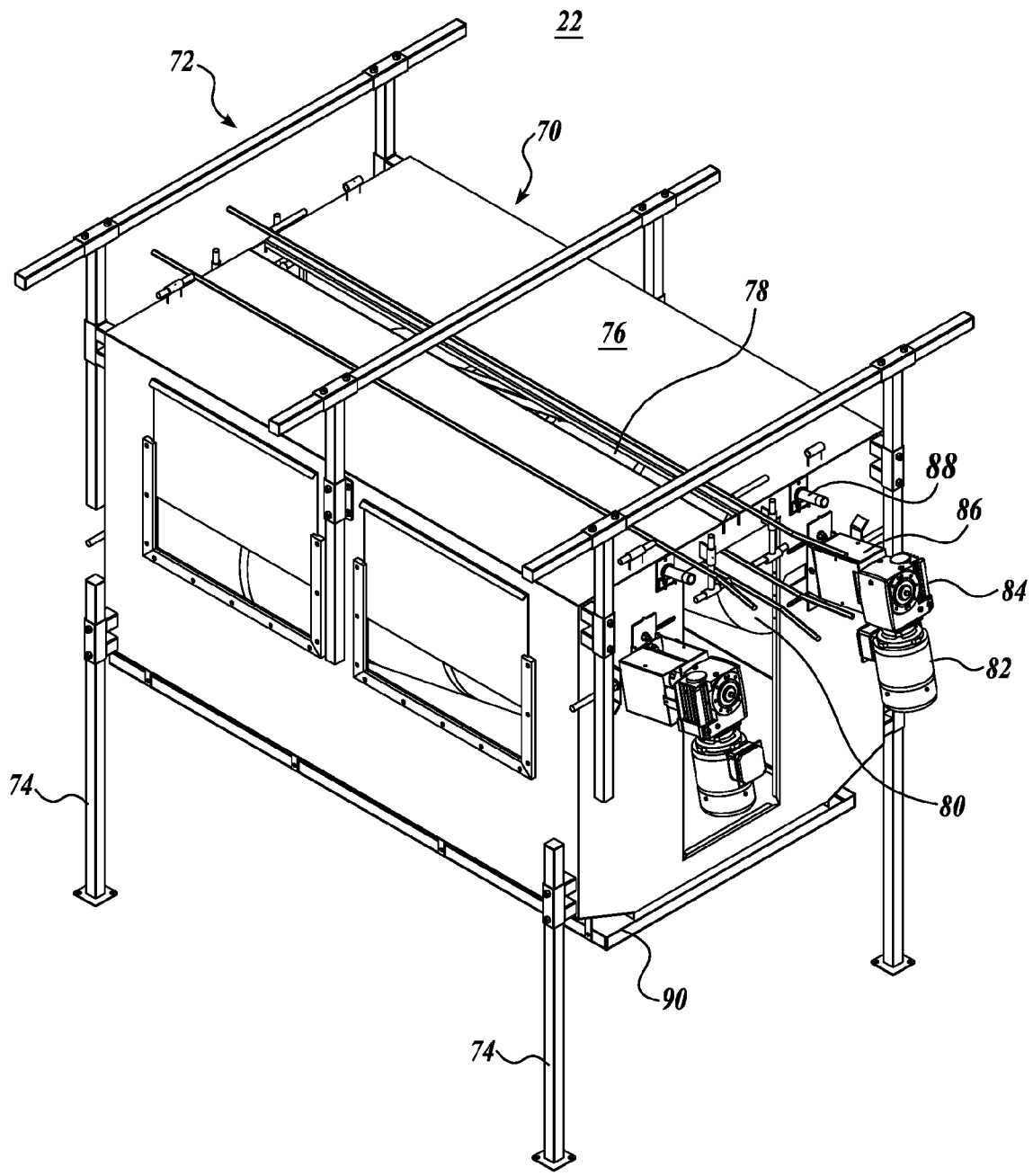
FIGS. 5 and 6 depict an isometric view and an end view of a brushing apparatus for ruffling the feathers of the poultry carcasses.
Figure 6:
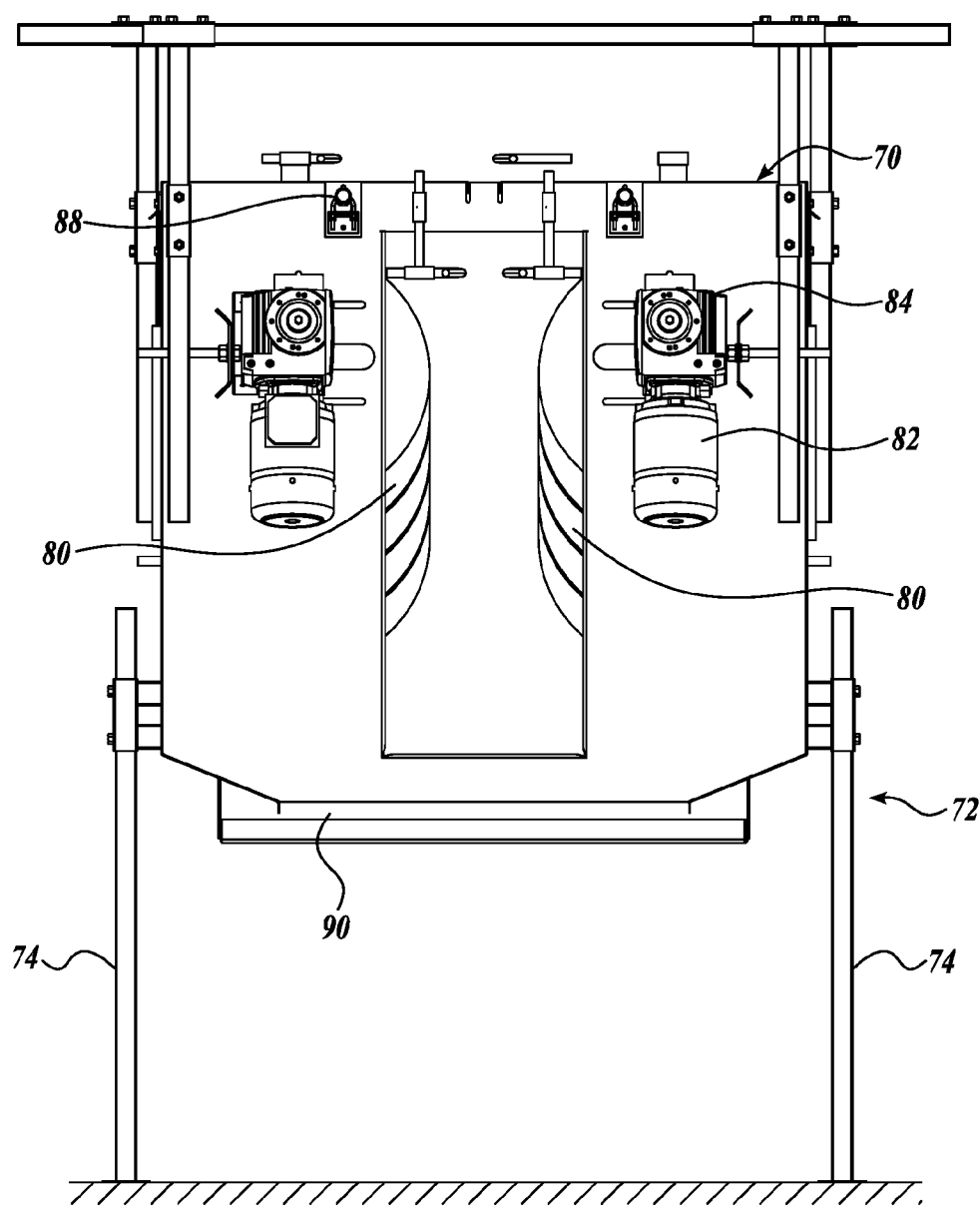

FIGS. 5 and 6 illustrate the brushing unit 22, which as noted above functions to ruffle the feathers of the poultry carcasses to thereby cause the feathers to stand out from the surface of the carcass rather than lying flat in layers on the carcass surface. The brushes also help remove dirt, debris, such as fecal matter, from the poultry carcasses.

As shown in FIGS. 5 and 6, the brushing unit 22 includes a housing 70 mounted on an exterior frame or stand unit 72, having adjustable height legs 74 so as to adjust the height of the unit 22 relative to the height of the overhead conveyor 22, which may be of fixed height. Also, the height of the unit 22 can be adjusted to the size of the poultry carcasses 50 being processed. The top wall 76 of the housing 70 is formed with longitudinal gap 78 extending there along. This gap is to provide clearance for the holders 54 of the conveyor 24.

A pair of side-by-side longitudinally extending brushes 80 are mounted in the housing 70 to rotate about a longitudinal axis when powered by motors 82. The motors 82 power right-hand or 90 degree drive units which in turn act through gear reducers 86 to power drive the shafts of the brushes 80. The axes of the brushes may be horizontal, or may be sloped to help ensure that the entire carcasses are brushed as the carcasses travel horizontally through the housing 70.

As also shown in FIGS. 5 and 6, water line headers 88 can extend through the housing 70 near the ceiling thereof along the central portion of the housing and above the corresponding portion of the brushes 80 to apply water to the carcasses 50 as they pass through the brush unit 22. Appropriate nozzles or other outlets are provided to direct the heated water downwardly toward the poultry carcasses 50.

As also shown in the figures, a tray 90 is positioned below the brushes 80 to collect feathers, debris, and other matter that are removed from the carcasses by the action of the brushes.

Although not shown, a conveyor system can be used in place of the tray 90 so as to continually remove the collected debris from the brushing unit 22.

Figure 7:
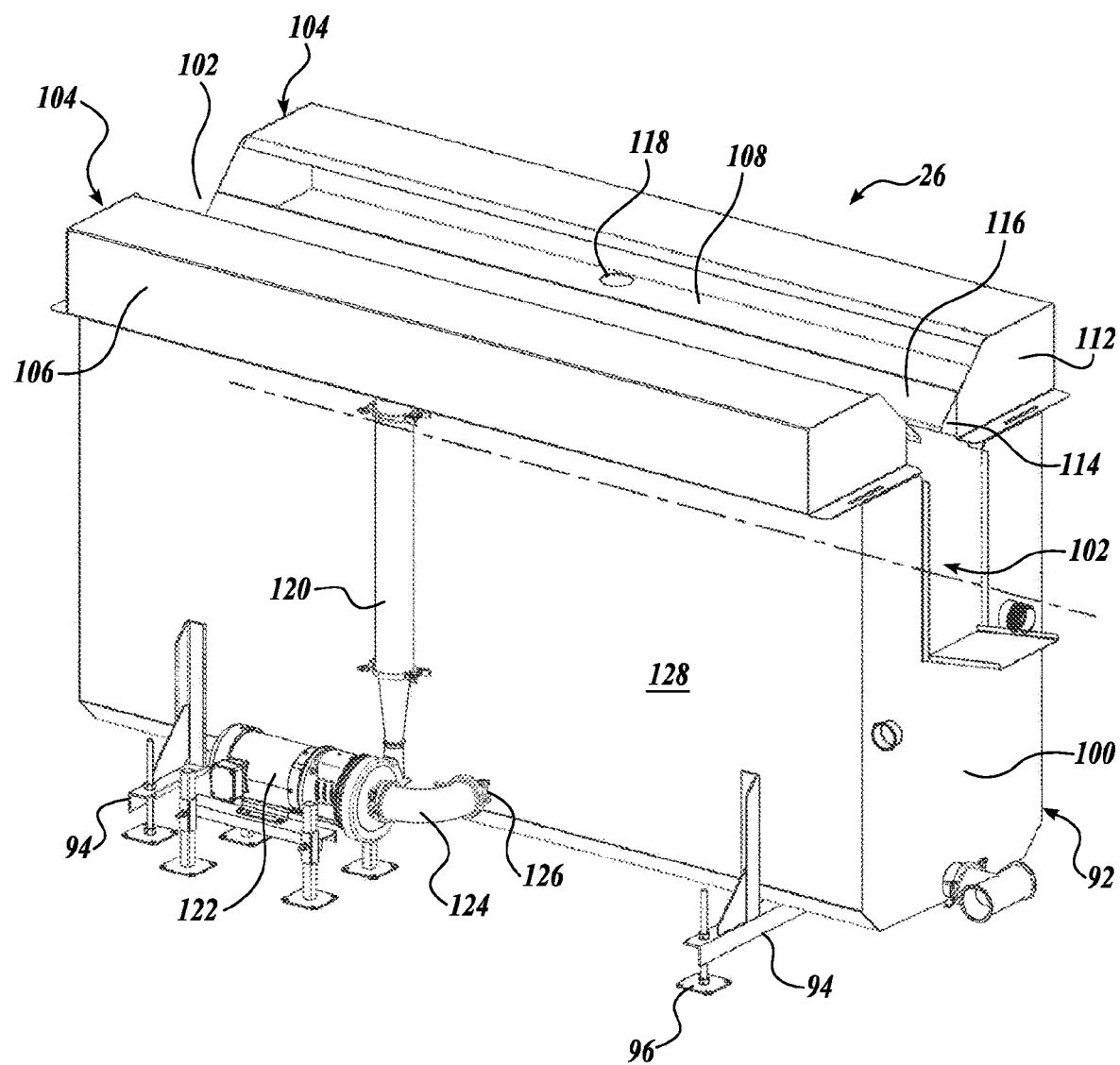
FIG. 7 is an isometric view of a dual cascading scalder for scalding the poultry carcasses.
Figure 8:
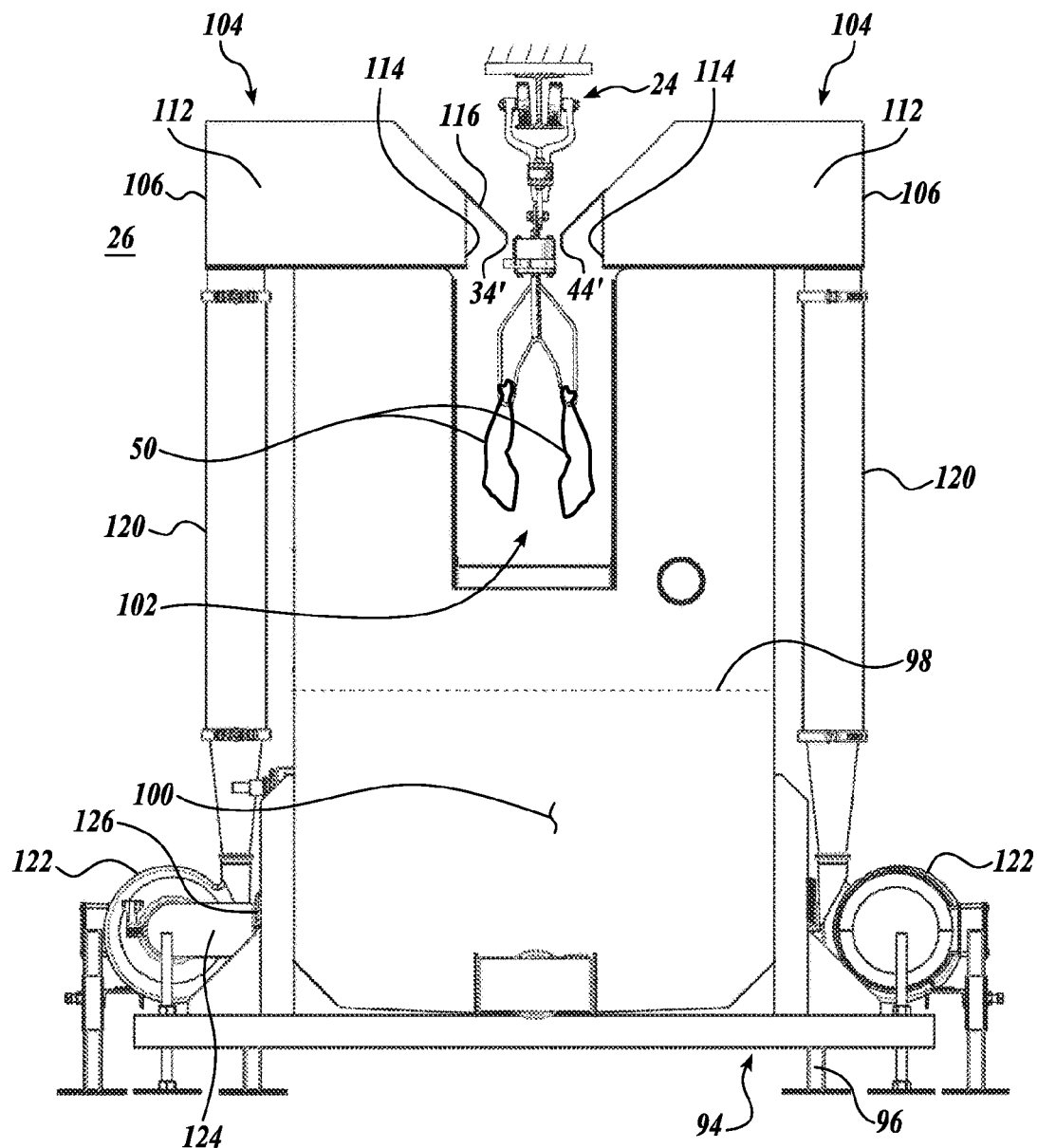
FIG. 8 is an end view of FIG. 7.

Referring to FIGS. 7 and 8, the dual cascading scalding unit 26 is illustrated. The unit 20 includes an elongated, generally rectangular and upright tank or reservoir 92 which is supported by underlying stands 94 utilizing vertically adjustable feet 96 to both level the scalding unit and adjust the height of the scalding unit to correspond to the elevation of the overhead conveyor 24 and the poultry carcasses 50, in the manner of the other units of the system 20 as described above. The length of the scalding unit 26 will vary according to need, which, as described above, may be a factor of the speed in which the poultry carcasses 50 travel along the conveyor, the size of the poultry carcasses, the type of the poultry carcasses, etc.

The reservoir 92 is designed to hold and store a desired volume of heated water 98. The reservoir 92 is constructed with end walls 100 having a gap 102 formed in the central upper sections of the end walls through which the poultry carcasses 50 pass as they are carried by the conveyor 24.

A pair of opposing, spaced-apart plenum chambers 104 are mounted to the top of the tank 92 of the scalding unit 26. Each of the plenum chambers 104 includes an exterior side wall 106 extending the length of the plenum chambers as well as a bottom wall 108 extending the full width of the plenum chambers, and a narrower top wall 110 also extending the length of the plenum chambers. End walls 112 close off the ends of the plenum chambers. An inside wall 114 extends upwardly part-way up the height of the end walls to intersect with the upper edge of a sloped spillway 116 which slopes downwardly and inwardly from the plenum chamber toward the longitudinal center of the unit 26.

As shown in FIG. 7, an opening 118 is formed in the bottom wall 108 of the plenum chamber for receiving heated water into the plenum chamber from an inlet tube or pipe 120 which is in fluid flow communication with a recirculation pump 122. The inlet to the pump 122 is in fluid flow communication with an inlet line 124 which is connected to an outlet 126 located at a lower portion of the tank side wall 128. Of course, the tank outlet 126 need not be located as shown in FIG. 7, but can be in another suitable location in the bottom portion of the tank or reservoir 92.

The circulation pump 122 continually pumps heated water from the reservoir 92 into the plenum chambers 104. As such, heated water from the plenum chambers 104 continually overflow from the plenum chambers onto the spillways 116 causing the heated water to cascade downwardly toward and into the reservoir or tank 92. This cascading heated water continually flows over the surfaces of the carcasses 50 passing between and beneath the spillways thereby heating the carcasses to a desired temperature so that the feathers can be easily removed.

It will be appreciated that due to the significant rate that the water cascades over the carcasses, thermal transfer from the water to the carcasses is rapid, especially compared to thermal transfer of heat from a typical scalding tank, as described above, wherein the carcass is submerged and pulled through the submersion tank in a standard manner. Applicant has found that through the use of the cascading heated water, not only is the carcass raised to a desired temperature faster than in the past, but also the heated water need not be heated to as high a temperature as in the use of a typical scalding tank, due to the more efficient heat transfer between the heated cascading water and the carcass passing beneath the cascading water.

Next, referring to FIGS. 1, 16, 17 and 18, a filtration system 150 is utilized to filter the water used in the dual cascade scalder units 28, 32 and 36. As one example of the present disclosure, the filtration system 150 utilizes a drum type filter system composed of in basic form a housing 152 that supports therein a drum screen 154 positioned generally centrally in the housing to rotate within the housing. Drive chains 155 engage the ends of the drum screen unit 154. The drive chains 154 are driven by overhead drive sprockets 156 mounted on a drive shaft 157, which is in turn powered by a drive motor 158.

The used heated water 98 from the bottom portion of reservoir 92 is routed to the tank housing 152 through line 160 connected to the reservoir 92, with the opposite end of the line connected to an inlet tube 162 extending part way into the interior of the drum screen 154. Solid matter from the reservoir 92 is retained within the interior of the drum screen 154 to pass out of the drum screen for disposal. The filtered water drops downwardly from the drum screen to the bottom portion of the tank/housing 152. A recirculation pump 164 returns the filtered water to the reservoir 92 through a transfer line 166. An antimicrobial agent can be used in conjunction with the filtered water returned to reservoir 92.

Although the filter system 150 has been described as utilizing a drum type filter, it is to be appreciated that system 20 is not limited to this type of filter system. Rather, numerous other types of filter systems that are capable of handling water at elevated temperatures may be utilized.

Next, referring specifically to FIG. 1, as can be appreciated, there will be loss of hot water from the cascading scalding units 28, 32 and 36 due to evaporation as well as water remaining on the carcasses, including the carcass feathers. As such, it will be necessary to add make-up water to the dual cascading scalding units. Such make-up water can be stored in a hot water tank 170, which is plumbed to deliver the make-up water to the scalding units via delivery lines 172, 174 and 176 as shown in FIG. 1. The hot water tank 170 can include an integral heating unit to raise the temperature in the tank to a desired level so that the temperature in the scalding units is retained at a desired level.

As an alternative to routing water from the hot water tank 170 to each of the scalding units, the make-up water can instead be routed to the last scalding unit 36 utilized in the system 20. In that situation, make-up water for the second scalding unit 32 can be obtained from the third scalding unit 36. Correspondingly, make-up water for the first scalding unit 26 can be obtained from the second scalding unit 32.

Figure 9:
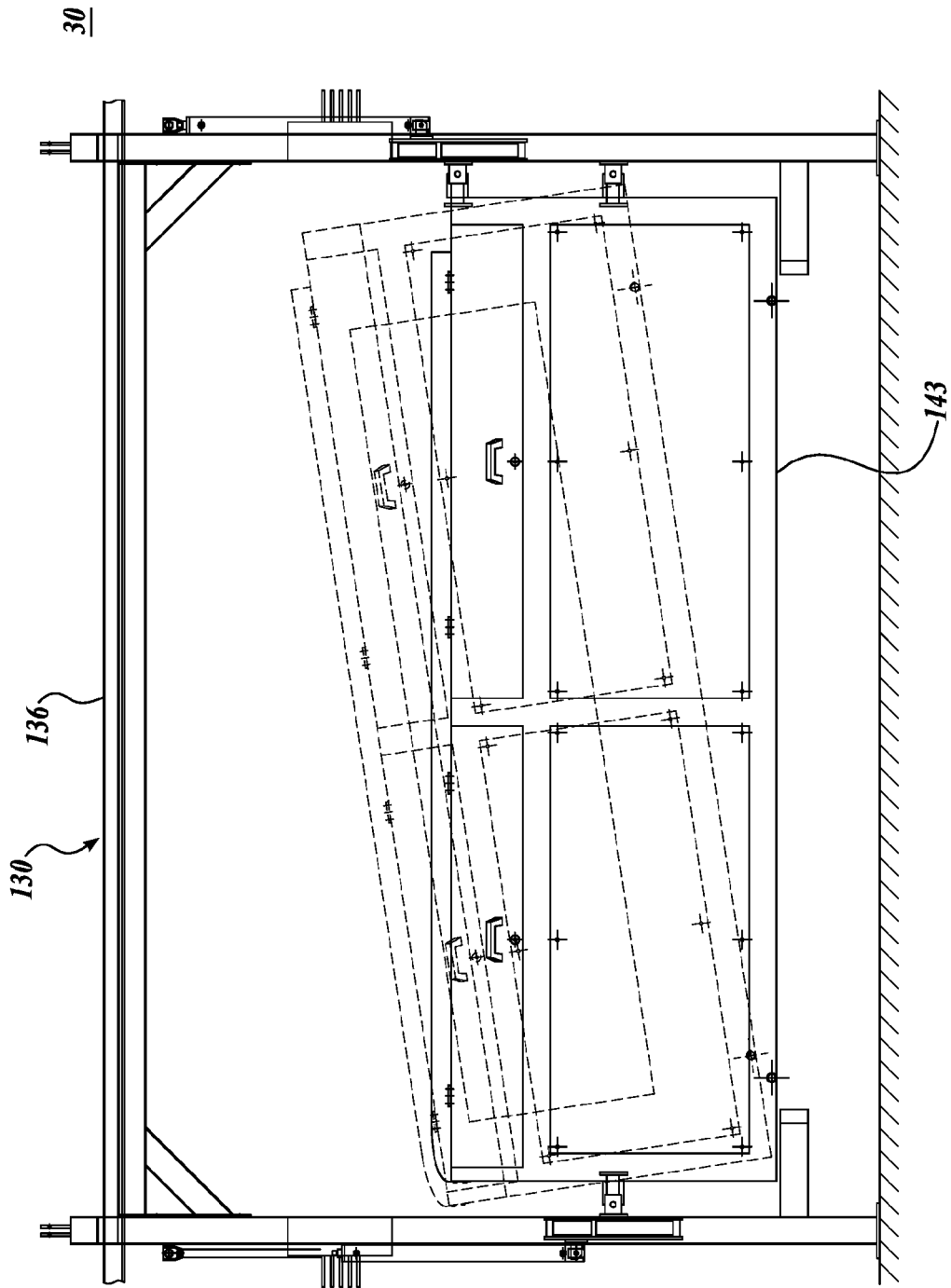
FIGS. 9 and 10 are a side elevational view and an end view of a quill picking unit to pull the feathers from the poultry carcass.
Figure 10:
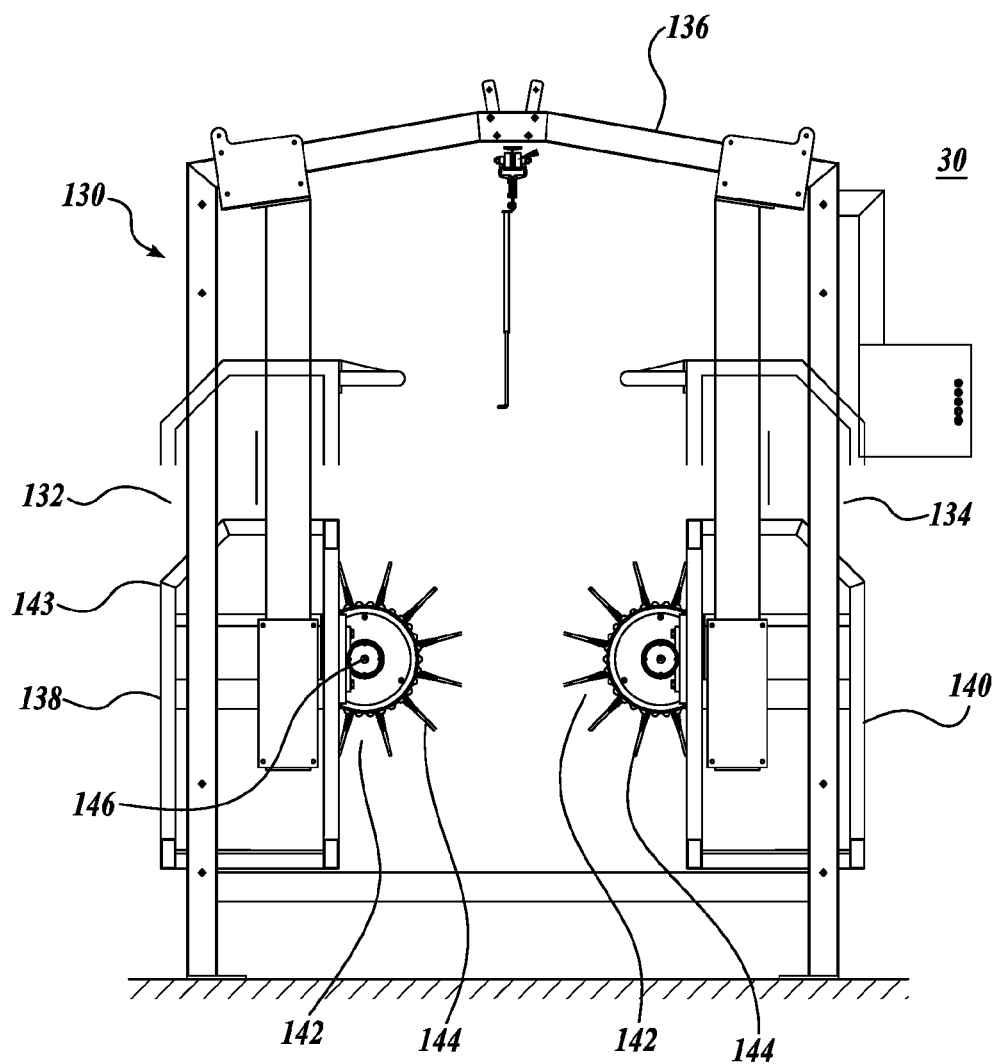

Next, referring to FIGS. 9 and 10, a primary quill picking unit 30 is illustrated as including a frame 130 having side sections 132 and 134 and a top section 136. The side sections 132 and 134 support exterior protective side panels 138 and 140.

As shown in FIGS. 9 and 10, the quill picking unit 30 also includes longitudinal finger assemblies 142 that extend substantially the length of the frame 130. The finger assemblies are mounted on frame sub-assemblies 143 secured to the side sections 132 and 134 of the frame 130. The finger assemblies 142 are each composed of numerous projecting fingers 144 that extend radially relative to the longitudinal rotational axis 146 of the finger assemblies. As the finger assemblies 142 rotate about their axis 146, the flexible fingers 144 press against the exterior of the carcasses and exert sufficient pressure to cause the feathers to be pulled from the carcasses, while otherwise not damaging the carcasses.

As shown in FIG. 9, the axis 146 about which the finger assemblies 142 rotate may be tilted from the horizontal so that the fingers 144 reach the entire height of the carcasses as the carcasses pass between the finger assemblies. As a result, the finger assemblies 142 are capable of removing a substantial amount of the feathers of the carcass as the carcass passes through the quill picking unit 30. The elevation and angle of tilt of the finger assemblies can be adjusted by altering the elevation of the ends of the sub-assemblies 143 relative to the ends of the frame side sections 132 and 134.

Figure 11:
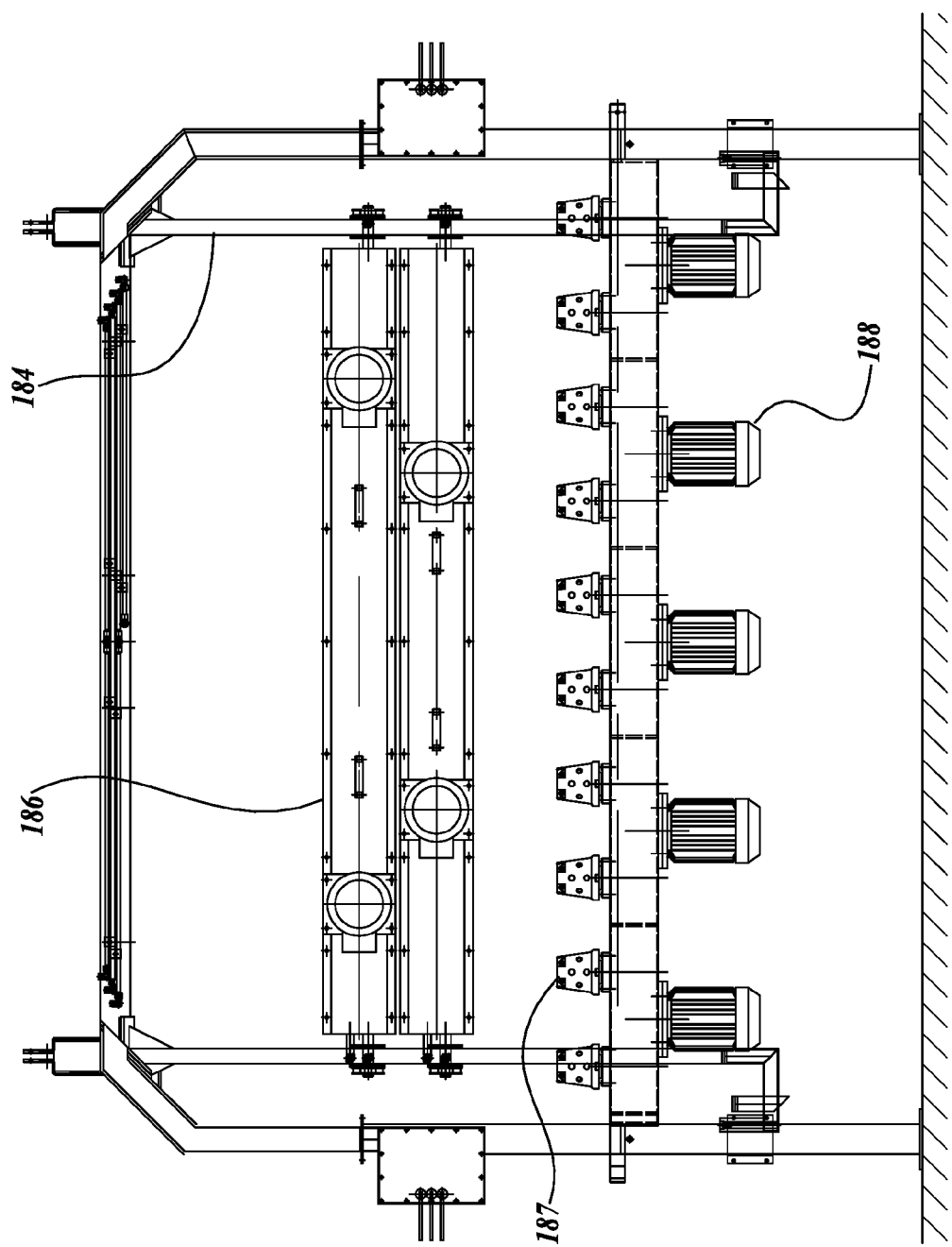
FIG. 11 is a side elevational view of a second form of quill picker to pull the feathers from the poultry carcass.
Figure 12:
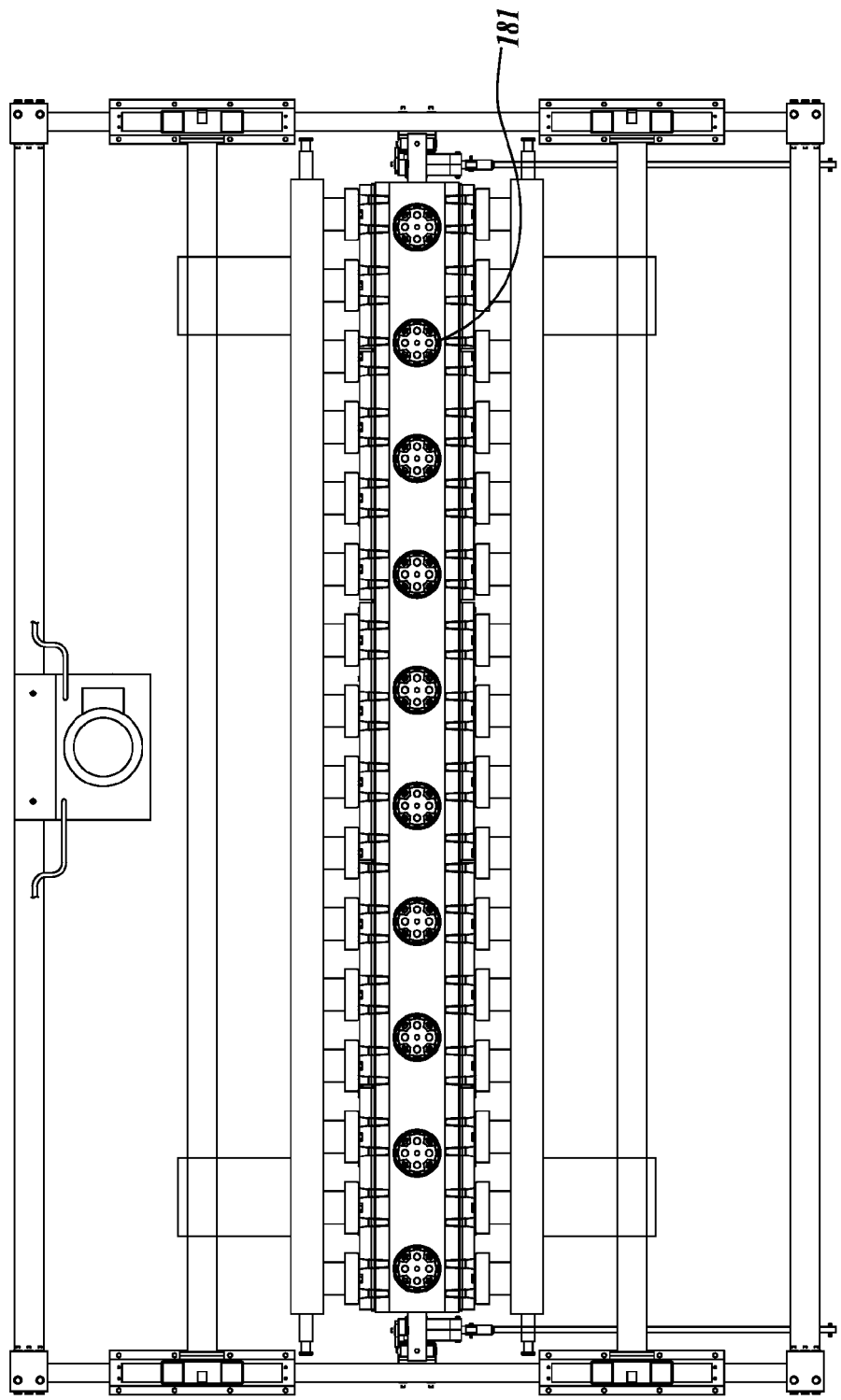
FIG. 12 is a top elevational view of FIG. 11.
Figure 13:
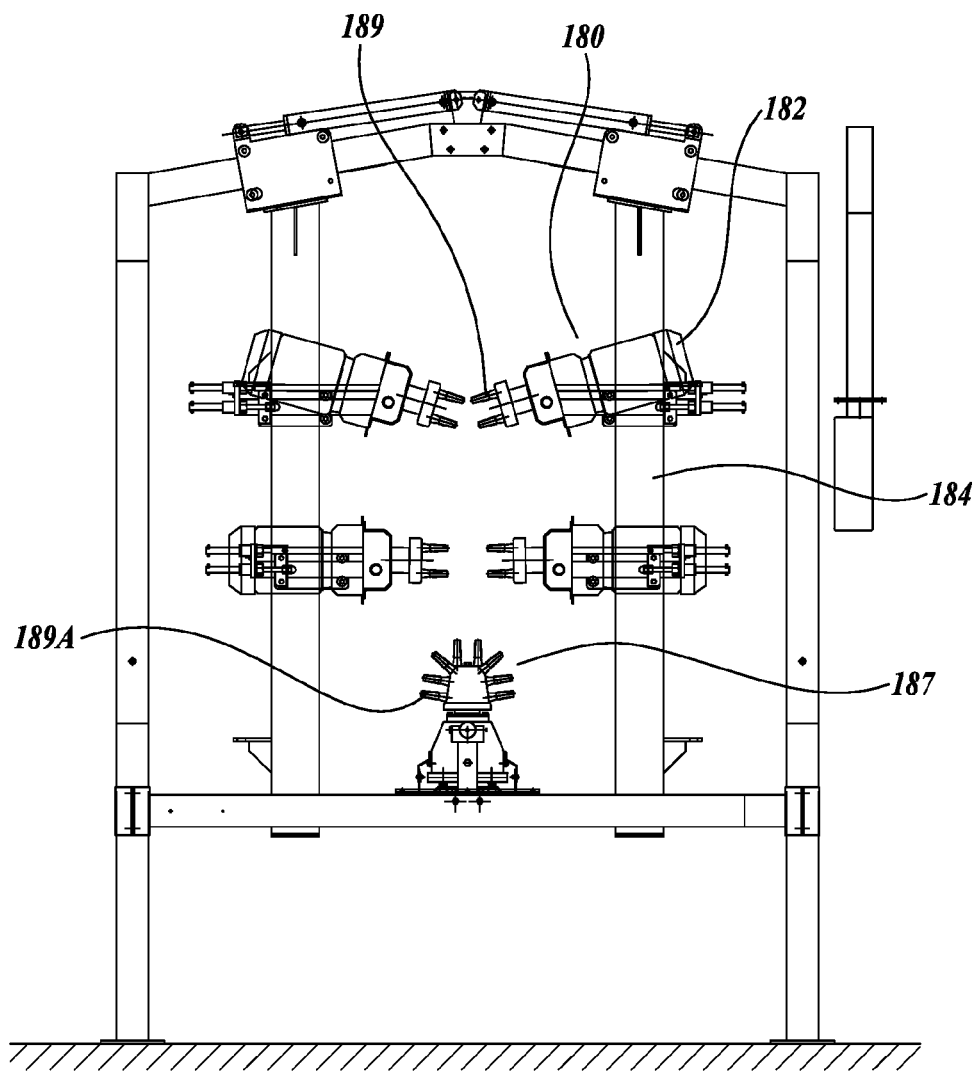
FIG. 13 is an end view of FIG. 11.

As shown in FIG. 1, quill picker units 34 and 38 also follows cascade scalding units 32 and 36, respectively. The quill picker units 34 and 38 can be constructed as shown in FIGS. 11-13. In this regard, the quill picking units each are composed of rotating picker heads 180 mounted on and powered by motors 182 which in turn are movable in the vertical direction on posts 104 as well as longitudinally along the length of the picking units along slide units 186. As such, the picker heads 180 can be positioned to optimally interact with the carcasses passing through the picker units to remove additional feathers from the carcasses.

In addition, a series of bottom picker heads 187 extend upwardly so as to interact with the lower portions of the passing carcasses 50. The lower picking heads 187 are powered by motors 188. As illustrated, the rotating picker heads 180 and 187 are composed of a plurality of flexible fingers 189 and 189A which project from the central base portions of the picker heads. These flexible fingers sweep across the carcass skin and the feathers in the path of the fingers thereby to pull the feathers from the carcasses 50. However, the fingers 189 and 189A do not gouge or otherwise damage the carcass due to their flexibility. Nonetheless, the fingers do apply sufficient pressure so as to be able to pull the feathers from the carcasses.

Figure 14:
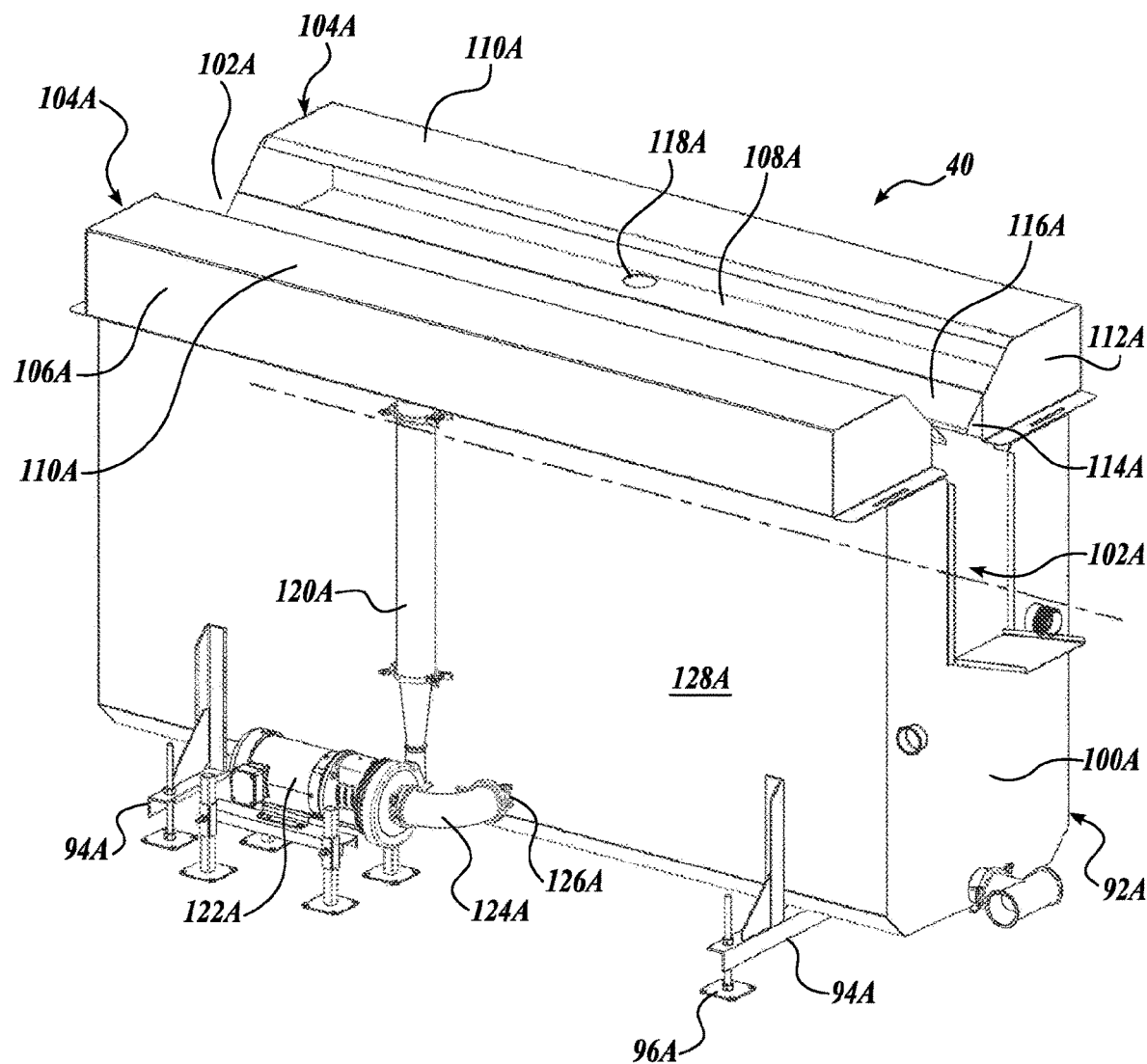
FIG. 14 is an isometric view of a dual cascading cooling unit for cooling the poultry carcasses.
Figure 15:
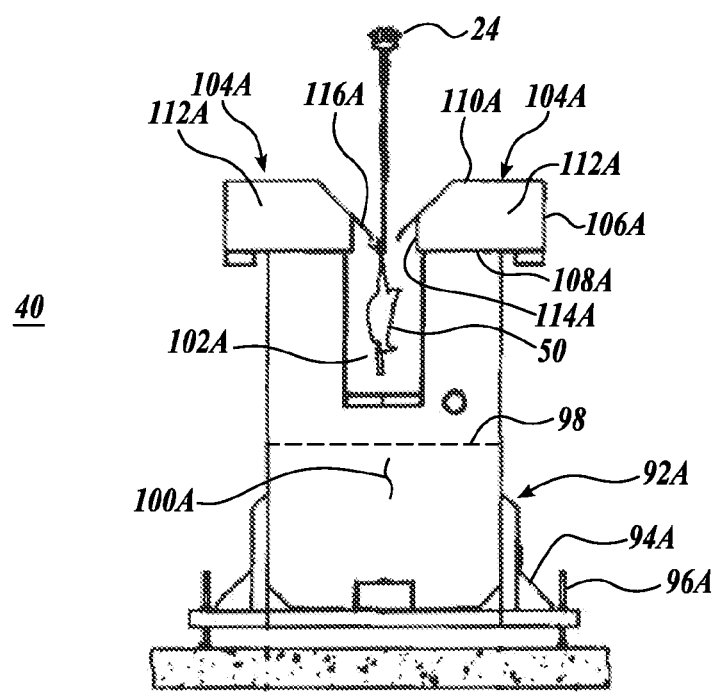
FIG. 15 is an end view of FIG. 14.
Figure 16:
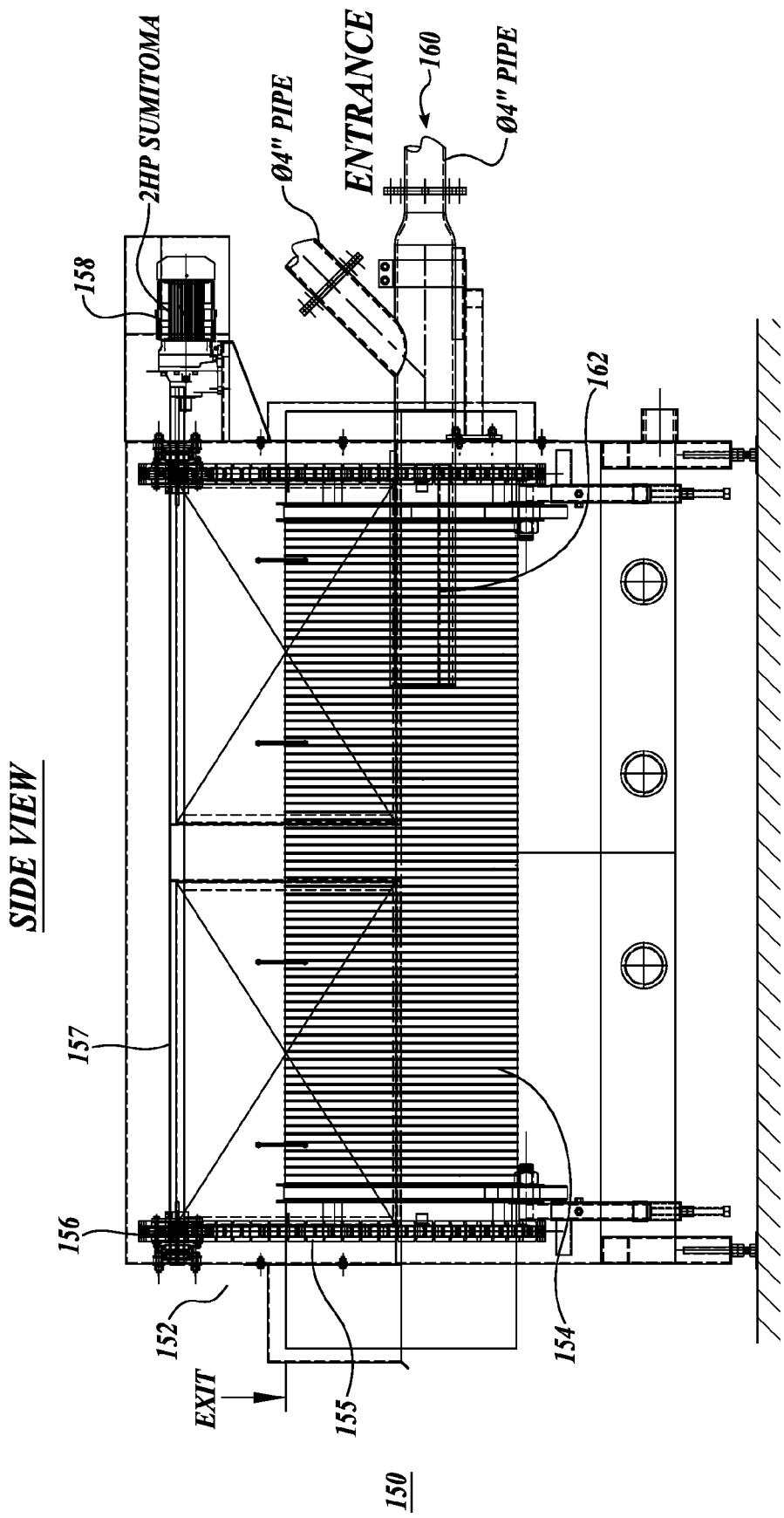
FIG. 16 is a side elevational view of a filtration system for filtering the processing water, and recirculating the processing water to units of the present system, including the cascading scalder.
Figure 17:
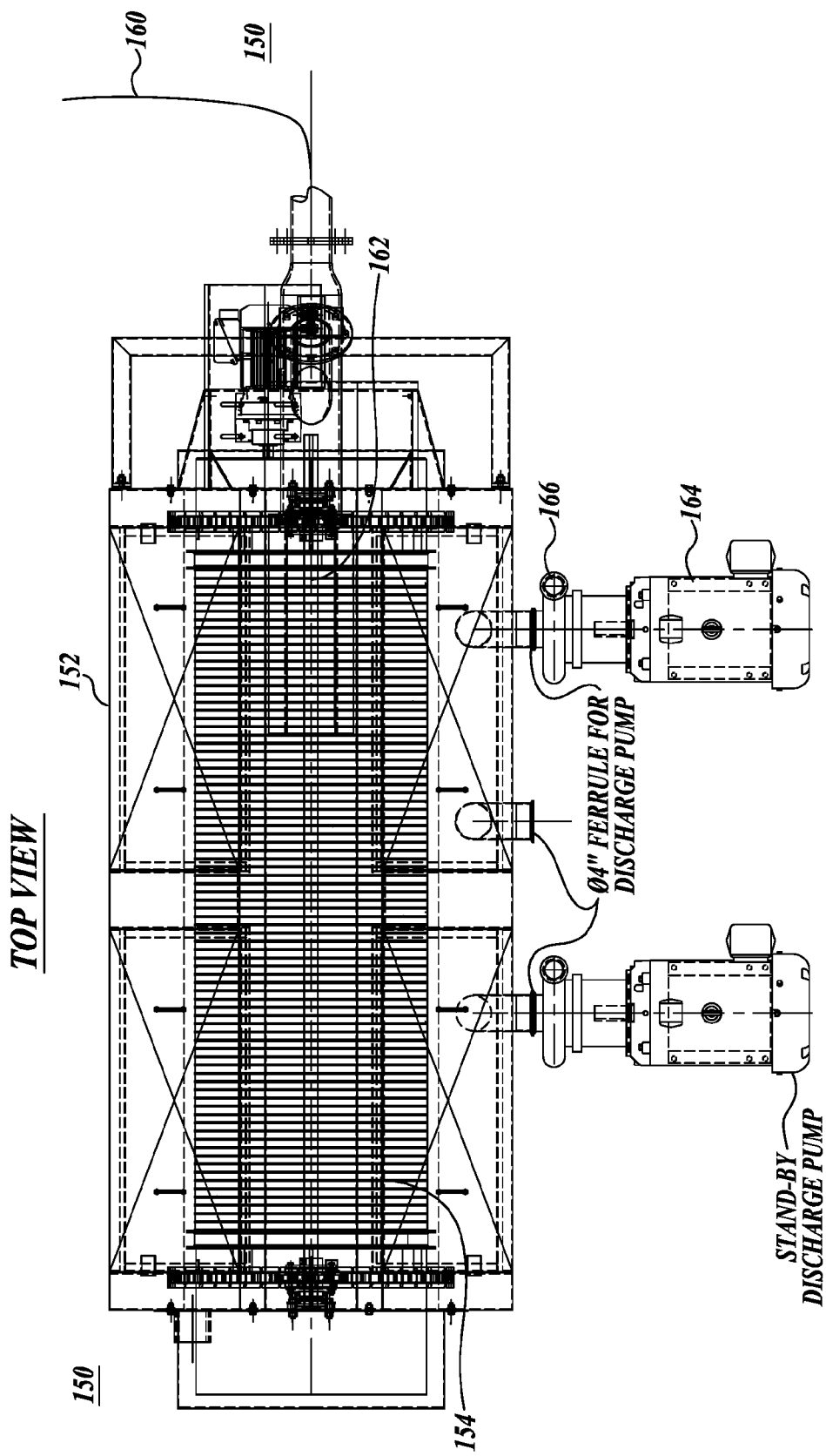
FIG. 17 is a top view of FIG. 16.
Figure 18:
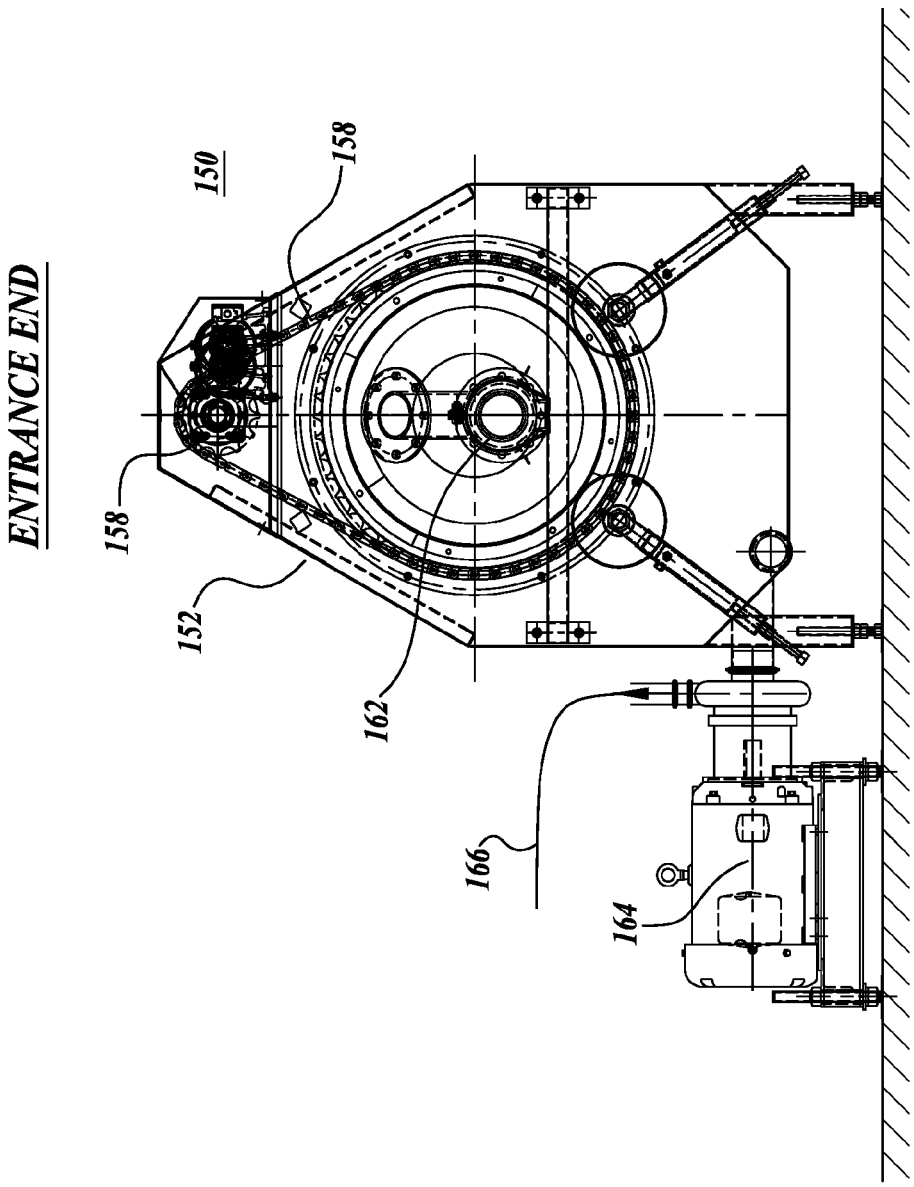
FIG. 18 is an end view of FIG. 16.

As noted above, after the last dual cascade scalding unit 36 and its subsequent quill picking unit 38, the system 20 includes a dual cascade cooling unit 40 for rapidly cooling the poultry carcass that has now been bereft of its feathers, thereby to reduce the bacterial or pathogen activity associated with the carcass. As shown in FIGS. 14 and 15, the cooling unit 40 is constructed similarly to the heating units 26, 32 and 36. As such, the components of the cooling unit 40 that are similar to the corresponding components of the heating units are identified with the same part number but with a suffix in the form of the letter "A."

As in the heating units, the cooling unit 40 in terms of length and capacity will be dependent on various factors, including the speed of the carcasses passing through the cooling unit, the size of the carcasses, the type of poultry being processed, the temperature of the cooling water, the temperature of the carcasses that arrive at the cooling units, etc. As such, the length of the tank or reservoir 92A of the cooling unit 40 may be longer or shorter than the lengths of the reservoirs 92 of the cooling units 26, 32, and 36.

Another difference between the cooling unit 40 and the heating units discussed above is that the cooling unit may not require a filtration system, such as filtration system 150 described above. Alternatively, the filtration system that is utilized with respect to the cooling unit may be of a different type than the filtration unit 150, especially since the carcass by the time reaching the cooling unit 40 is likely not to have feathers or any appreciable dirt or debris still on the carcass. Nonetheless, it may be desirable to have a system for filtering the coolant water of the cooling unit 40.

After leaving the cooling unit 40, the carcasses 50 are routed through a paw scrubber 42. The paw scrubber includes brushes that are used to clean the poultry paws to the extent the paws have not been already been cleaned by the present system and method.

Figure 2:
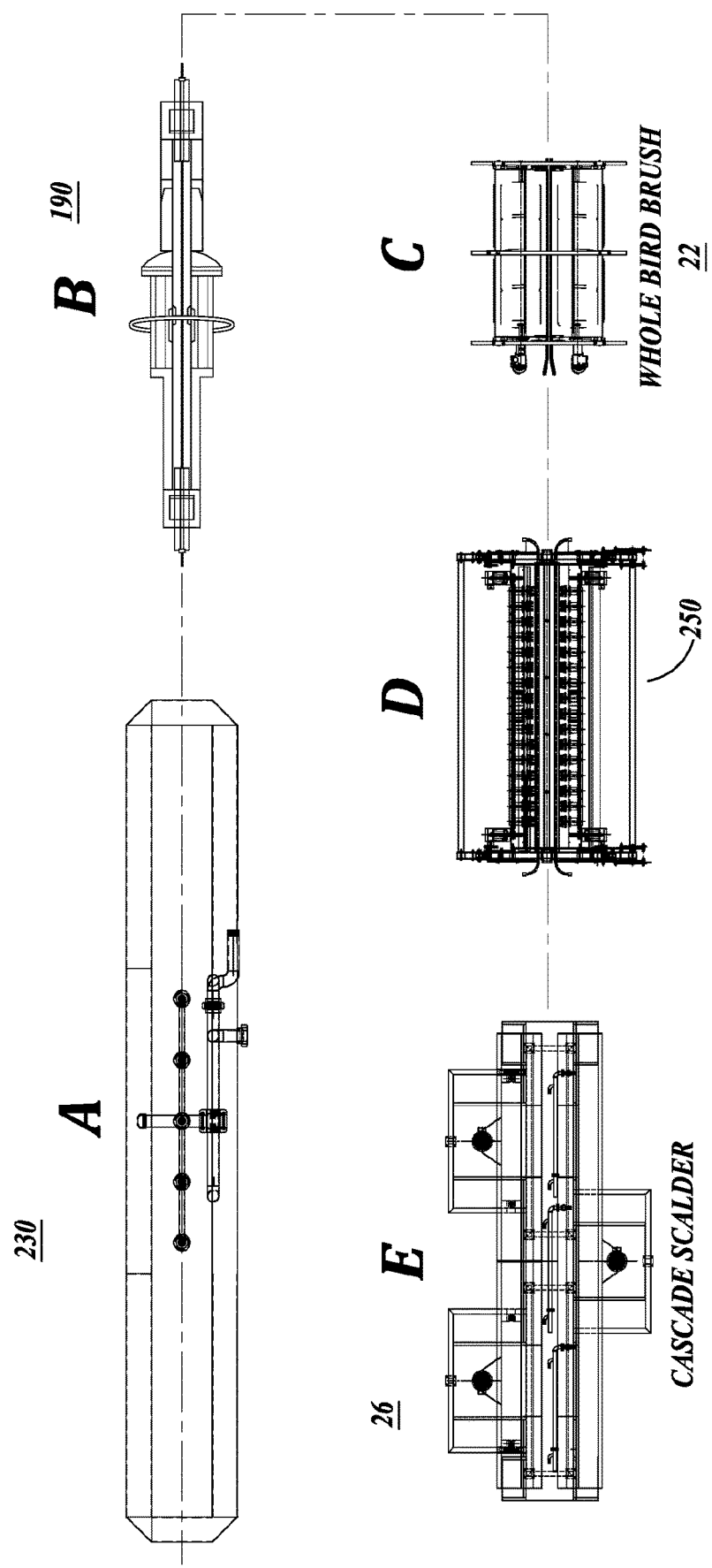
FIG. 2 is a schematic view of optional additional aspects of the system for removing feathers from poultry carcasses.

FIG. 2 illustrates optional components of the system 20. For example, a quill picker 250, which can be similar to quill picker 30 or 34, or can be of a different construction, can be located between the carcass brushing unit 22 and the first dual cascade scaling unit 26. This quill picker 250 can begin the process of removing feathers from the carcass. In this regard, the quill picker 250 will be provided with a heated water system for applying heated water to the carcass as the carcass is being processed in the quill picking unit. The water supply system can be in the form of overhead headers extending above the quill picking units, thereby to apply heated water downwardly onto the carcasses as the carcasses are being processed. Outlets, in the form of nozzles or otherwise, can extend along the header to direct the heated water downwardly onto the carcass.

Also, optionally, a tail quill picking or puller unit 190 may be positioned upstream from the brushing unit 22. The tail quill picking unit is especially adapted for removing the tail feathers from the carcass which are more difficult to remove than are the typical feathers of the poultry carcass.

The tail quill puller unit is illustrated in FIGS. 19, 20 and 21. As most clearly shown in FIG. 19, the tail quill picker includes a series of closely spaced rollers 192 arranged in a vertical array lengthwise of the direction of travel of the carcasses 50, with the leading end portions 194 of the rollers slightly lower in elevation than the trailing end portions of the rollers 196. The rollers 192 are arranged in sets of two that are powered by a motor 198 so as to counter-rotate relative to each other. As such, when the poultry carcass passes by the unit 190, the tail quills face the rollers 192. As such, the roller sets capture the ends of the tail quills therebetween, and thus pull the tail quills from the carcass between the two rollers of each set. Also, by tilting the rollers as shown in FIG. 19, there is the increased likelihood that more of the tail quills will be captured by the rollers than if the rollers 192 were simply horizontal.

As noted above, the rollers 192 are powered by motor 198 that acts through a speed reducer 200, and then through a belt or drive chain 202 to drive the ends of the rollers 192 at a desired speed so as to enable the unit 190 to pull the tail feathers from the carcass as the carcass passes by.

A vertical frame 204 is provided with spaced apart posts 206 for supporting the rollers 192 and motor 198. The rollers 192 are mounted on a housing 208, and the ends of the housing are coupled to sleeves 210 which slidably engage over the posts 206. As a consequence, the vertical height of the rollers 192 can be adjusted by a linear actuator 212, which is connected to the upper side of the housing 208 as well as the motor 198, with the upper end of the actuator connected to a top crossbar 214 of the frame 204. As such, extension or contraction of the linear actuator 212 raises and lowers the rollers 192 so as to correctly position the rollers relative to the height of the tail quills of the poultry carcasses 50 being processed.

Unit 190 shown in FIGS. 19-21 and described above is one example of such an apparatus. It is to be understood that other types of tail quill pulling units may be utilized in conjunction with the present disclosure.

Figure 23:
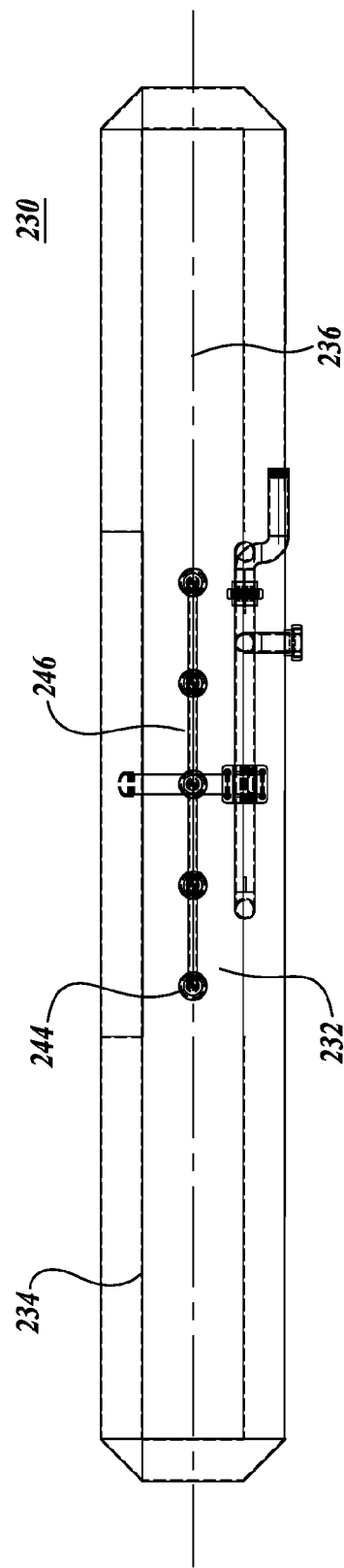
FIG. 23 is a top view of FIG. 22.

As shown in FIG. 2, also optionally upstream from the brushing unit 22 and/or the tail quill picker 190, heated water can be applied to the carcass 50 to facilitate the removal of the tail quills as well as to facilitate the brushing of the carcass. One example of applying the heated water to the carcass is through the use of a circulation tank 230 as shown in FIGS. 22 and 23. The tank 230 has a full depth center section 232 as well as shallower, tapered forward section 234 and shallower, tapered rearward section 236. The top of the tank is open and defines a trough through which the carcasses 50 can be lowered into and then moved through the heated water and then removed at the rearward end 236 of the circulation tank.

Heated water is delivered to the tank by a distribution header 242 extending longitudinally along the center section 232 of the tank. Outlets or nozzles 244 extend upwardly from the header 242.

Other systems can be utilized for applying heated water to the carcasses in lieu of the circulation tank 230. For example, nozzles can be used to spray heated water onto the carcasses upstream from the tail quill picker 190. A shield or housing can be used to surround the nozzles thereby to confine the spray of the heated water.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for removing feathers from poultry carcasses, comprising:
    (a) scalding the poultry carcasses by passing the carcasses under a dual cascade of heated water, the cascade of heated water passing over and off the poultry carcasses and into a reservoir for collecting the heated water cascading off the poultry carcasses, the poultry carcasses being at an elevation above the water in the reservoir enabling heat transfer from the cascading water to the poultry carcasses before the water is collected in the reservoir;
    (b) after the scalding of the carcasses, passing the carcasses through a quill picking unit to pull the feathers from the heated carcasses;
    (c) after passing the carcasses through the quill picking machine, cooling the carcasses by passing the carcasses under a cascade of chilled water.

2. The method of claim 1, after passing the carcasses through the quill picking machine, re-scalding the carcasses at least one additional time by again passing the carcasses under a dual cascade of heated water, and then passing the carcasses through a quill picking machine to pull further feathers from the carcasses.

3. The method of claim 1, further comprising collecting the heated water after cascading over the carcasses, filtering the collected heated water for removal of particulate matter, and recirculating the filtered water to again cascade over the poultry carcasses.

4. A method for removing feathers from poultry carcasses, comprising:
    (a) scalding the poultry carcasses by passing the carcasses under a dual cascade of heated water, the cascade of heated water passing over and off the poultry carcasses and into a reservoir;
    (b) after the scalding of the carcasses, passing the carcasses through a quill picking unit to pull the feathers from the heated carcasses;
    (c) after passing the carcasses through the quill picking machine, cooling the carcasses by passing the carcasses under a cascade of chilled water; and
    (d) wherein before the initial dual cascade of heated water is applied to the carcasses, ruffling in the feathers of the carcasses to cause the feathers to stand out from the carcasses.

5. The method of claim 4, wherein after ruffling the feathers of the carcasses, passing the carcasses through a quill picking machine to pull feathers from the carcasses, while at the same time applying heated water to the carcasses.

6. The method of claim 1, further comprising removing the tail quills from the carcasses before the initial scalding of the carcasses with the dual cascade of heated water.

7. The method of claim 1, further comprising before scalding the carcasses with a dual cascade of heated water, passing the carcasses through a quill picking machine to pull the feathers from the carcasses.

8. A method for removing feathers from poultry carcasses, comprising:
    (a) scalding the poultry carcasses by passing the carcasses under a dual cascade of heated water, the cascade of heated water passing over and off the poultry carcasses and into a reservoir;
    (b) after the scalding of the carcasses, passing the carcasses through a quill picking unit to pull the feathers from the heated carcasses;
    (c) after passing the carcasses through the quill picking machine, cooling the carcasses by passing the carcasses under a cascade of chilled water;
    (d) before scalding the carcasses with a dual cascade of heated water, passing the carcasses through a quill picking machine to pull the feathers from the carcasses; and
    (e) applying heated water to the carcasses while passing the carcasses through the quill picking machine.

9. For a system for removing feathers from poultry carcasses, a scalding apparatus for scalding the poultry carcass to open the pores of the carcasses, the scalding apparatus comprising:
    (a) a reservoir for retaining heated water;
    (b) a first plenum located above the reservoir for receiving the heated water from the reservoir;
    (c) a second plenum positioned above the reservoir for receiving the heated water from the reservoir;
    (d) the first and second plenums spaced apart from each other to define a gap therebetween through which the poultry carcasses can travel;
    (e) a circulation pump in communication with the reservoir and at least one of the plenums for pumping the heated water from the reservoir to at least one of the plenums causing the heated water to overflow out of the two plenums and cascade downwardly into the gap and onto the poultry carcasses passing through the gap and then off the poultry carcasses to collect in the reservoir below the level of the poultry carcasses; and
    (f) the reservoir having a first end portion and a second end portion, and upwardly open openings formed in the first and second end portions above the level of the heated water in the reservoir and of a sufficient height to allow passage of the poultry carcasses through the openings while the poultry carcasses are positioned below the level of heated water flowing out the two plenums to receive the cascading heated water from the two plenums.

10. The system of claim 9, further comprising a quill picking machine located downstream of the scalding apparatus for pulling the feathers from the carcasses.

11. The system of claim 10, wherein the quill picking machine comprising rotating fingers that slide along the surfaces of the carcasses to remove the feathers from the carcasses.

12. The system of claim 11, further comprising a cooling unit for applying a cascade of cooling water over the carcasses after removal of the feathers from the carcasses.

13. The system of claim 10, further comprising a second scalding apparatus constructed in accordance with claim 9 positioned downstream of the quill picking machine.

14. The system according to claim 13, further comprising a further quill picking machine positioned downstream of the second scalding apparatus to remove further feathers from the carcasses.

15. The system of claim 14, further comprising a cooling unit for applying a cascade of cooling water over the carcasses after removal of the feathers from the carcasses.

16. The system according to claim 9, further comprising at least one additional scalding apparatus constructed according to claim 9.

17. The system according to claim 16, wherein the scalding apparatus is positioned so that a quill picking unit for removing the feathers of the carcasses is positioned after each scalding apparatus.

18. The system of claim 17, further comprising a cooling unit located after the last quill picking unit for applying a cascade of cooling water over the carcasses after removal of the feathers from the carcasses.

19. For a system for removing feathers from poultry carcasses, a scalding apparatus for scalding the poultry carcasses to open the pores of the carcasses, the scalding apparatus comprising:

(a) a reservoir for retaining heated water;

(b) a first plenum located above the reservoir for receiving the heated water from the reservoir;

(c) a second plenum positioned above the reservoir for receiving the heated water from the reservoir;

(d) the first and second plenums spaced apart from each other to define a gap therebetween through which the poultry carcasses can travel;

(e) a circulation pump in communication with the reservoir and at least one of the plenums for pumping the heated water from the reservoir to at least one of the plenums causing the heated water to overflow out of the two plenums and cascade downwardly into the gap and onto the poultry carcasses passing through the gap and then off the poultry carcasses to collect in the reservoir below the level of the poultry carcasses; and (f) a brushing unit positioned upstream from the scalding apparatus, the brushing unit operable to ruffle the feathers of the poultry carcasses and for removing debris from the carcasses.

20. The system according to claim 19, further comprising a tail quill picking unit for removing the feathers from the carcasses, the quill picking machine positioned downstream from the brushing unit and upstream from the scalding unit.

* * * * *